US011953035B2

(12) United States Patent
Abe et al.

(10) Patent No.: US 11,953,035 B2
(45) Date of Patent: Apr. 9, 2024

(54) WORKING MACHINE

(71) Applicant: KUBOTA CORPORATION, Osaka (JP)

(72) Inventors: Daiki Abe, Osaka (JP); Ryota Hamamoto, Osaka (JP); Hiroaki Nakagawa, Osaka (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 18/221,055

(22) Filed: Jul. 12, 2023

(65) Prior Publication Data

US 2023/0349402 A1 Nov. 2, 2023

Related U.S. Application Data

(62) Division of application No. 17/396,143, filed on Aug. 6, 2021, now Pat. No. 11,781,572.

(30) Foreign Application Priority Data

Aug. 15, 2020 (JP) ................................ 2020-137175
Aug. 15, 2020 (JP) ................................ 2020-137182

(51) Int. Cl.
*F15B 21/0423* (2019.01)
*E02F 9/22* (2006.01)
(Continued)

(52) U.S. Cl.
CPC ........ *F15B 21/0423* (2019.01); *E02F 9/2246* (2013.01); *E02F 9/226* (2013.01); (Continued)

(58) Field of Classification Search
CPC .. F15B 21/042; F15B 21/0423; E02F 9/2246; E02F 9/226
See application file for complete search history.

(56) References Cited

U.S. PATENT DOCUMENTS 4,062,329 A 12/1977 Rio
7,281,370 B2 10/2007 Furuta
(Continued)

FOREIGN PATENT DOCUMENTS

JP 2000-303838 A 10/2000
JP 2012-002161 A 1/2012
(Continued)

OTHER PUBLICATIONS

Office Action dated Aug. 22, 2023 in family member Japanese application No. 2020-137175 and English language translation thereof.

*Primary Examiner* — Michael Leslie
(74) *Attorney, Agent, or Firm* — GREENBLUM & BERNSTEIN, P.L.C.

(57) ABSTRACT

A working machine includes a prime mover, a hydraulic pump driven by power of the prime mover, a cooler including a cooling fan rotated by either the power of the prime mover or hydraulic fluid delivered from the hydraulic pump, and a controller configured or programmed to perform a reduction control for reducing a target fan rotation speed that is a target rotation speed of the cooling fan in response to reduction of an actual prime mover rotation speed that is an actual rotation speed of the prime mover, and to perform, after the reduction control, a restoration control for restoring the target fan rotation speed. The controller is configured or programmed to make a difference between a reduction rate of the target fan rotation speed in the reduction control and an increase rate of the target fan rotation speed in the restoration control.

7 Claims, 16 Drawing Sheets

(51) Int. Cl.
*F01P 7/04* (2006.01)
*F15B 21/02* (2006.01)

(52) U.S. Cl.
CPC ............... *F01P 7/044* (2013.01); *F15B 21/02* (2013.01); *F15B 2211/20523* (2013.01); *F15B 2211/20576* (2013.01); *F15B 2211/62* (2013.01)

(56) References Cited

U.S. PATENT DOCUMENTS

| | | | | |
|---|---|---|---|---|
| 8,459,959 | B2 * | 6/2013 | Imaizumi | F15B 21/0423 60/329 |
| 8,955,472 | B2 | 2/2015 | Shintani | |
| 10,006,188 | B2 | 6/2018 | Fukuda | |
| 11,293,333 | B2 | 4/2022 | Frick | |
| 11,353,048 | B2 | 6/2022 | Fukuda | |
| 11,396,839 | B2 | 7/2022 | Tanaka | |
| 11,619,161 | B2 | 4/2023 | Babbitt | |
| 11,781,572 | B2 * | 10/2023 | Abe | F15B 21/0423 60/368 |
| 2013/0092366 | A1 | 4/2013 | Hyodo et al. | |

FOREIGN PATENT DOCUMENTS

| | | | |
|---|---|---|---|
| JP | 2016-145493 | A | 8/2016 |
| JP | 2018-048570 | A | 3/2018 |
| JP | 2018-204588 | A | 12/2018 |

* cited by examiner

WORKING MACHINE

CROSS REFERENCE TO RELATED APPLICATIONS

This is a divisional application of U.S. application Ser. No. 17/396,143, filed Aug. 6, 2021, which claims priority to JP App. No. 2020-137182, filed Aug. 15, 2020, and JP App. No. 2020-137175, filed Aug. 15, 2020, the entire disclosures of which are incorporated by reference herein.

FIELD OF THE INVENTION

The present invention relates to a working machine.

DESCRIPTION OF THE RELATED ART

A working machine disclosed in Japanese Unexamined Patent Publication No. 2016-145493 is known.

The working machine disclosed in Japanese Unexamined Patent Publication No. 2016-145493 includes a working device and a traveling device that are driven by a power of a prime mover, and the devices perform work operations. In addition, the working machine includes a hydraulic pump that is driven by the power of the prime mover, and drives a cooler configured to cool cooled objects such as an oil cooler and a radiator with hydraulic fluid delivered from the hydraulic pump.

SUMMARY OF THE INVENTION

In the working machine disclosed in Japanese Unexamined Patent Publication No. 2016-145493, horsepower is consumed by the cooling system in heavy-duty work where a load on the prime mover is large, and thus the horsepower available for the working device and the traveling device is reduced. As a result, workability of the machine is reduced.

In view of the above-mentioned problems, the present invention intends to provide a working machine capable of improving workability.

Means of Solving the Problems

In an aspect, a working machine includes a prime mover, a hydraulic pump driven by power of the prime mover, a cooler including a cooling fan rotated by either the power of the prime mover or hydraulic fluid delivered from the hydraulic pump, and a controller configured or programmed to perform a reduction control for reducing a target fan rotation speed that is a target rotation speed of the cooling fan in response to reduction of an actual prime mover rotation speed that is an actual rotation speed of the prime mover, and to perform, after the reduction control, a restoration control for restoring the target fan rotation speed. The controller is configured or programmed to make a difference between a reduction rate of the target fan rotation speed in the reduction control and an increase rate of the target fan rotation speed in the restoration control.

Also, the controller is configured or programmed to make the increase rate of the target fan rotation speed in the restoration control less than the reduction rate of the target fan rotation speed in the reduction control.

Also, the controller is configured or programmed to perform the reduction control when the actual prime mover is reduced to a value less than a threshold rotation speed. The controller includes a first setting unit configured or programmed to set the target fan rotation speed unless the actual prime mover rotation speed is reduced to a value less than the threshold rotation speed, a second setting unit configured or programmed to set the target fan rotation speed when the reduction control is performed, and a third setting unit configured or programmed to set the target fan rotation speed when the restoration control is performed.

Also, the second setting unit is configured or programmed so that a second target fan rotation speed that is the target fan rotation speed for the reduction control is less than a first target fan rotation speed that is the target fan rotation speed set by the first setting unit, and the third setting unit is configured or programmed so that a third target fan rotation speed that is the target fan rotation speed for the restoration control is not less than the second target fan rotation speed and is less than the first target fan rotation speed.

Also, the working machine includes a measurement device configured to measure at least either one of a water temperature that is a temperature of cooling water circulated in the working machine and a fluid temperature that is a temperature of hydraulic fluid circulated in the working machine. Each of the first, second and third setting units is configured or programmed to set the corresponding first, second or third target fan rotation speed based on the at least either one of the water temperature and the fluid temperature measured by the measurement device.

Also, the third setting unit is configured or programmed to increase an increase rate of the third target fan rotation speed according to increase of the least one of the water temperature and the fluid temperature measured by the measurement device.

Also, the third setting unit is configured or programmed to set a plurality of target rotation speeds each of which serves as the third target fan rotation speed that is not less than the second target fan rotation speed and is less than the first target fan rotation speed.

Also, the controller is configured or programmed to select either greater one of the target fan rotation speed set based on a water temperature that is a temperature of cooling water circulated in the working machine and the target fan rotation speed set based on a fluid temperature that is a temperature of hydraulic fluid circulated in the working machine.

Also, the controller is configured or programmed to keep the reduction control from being performed when a water temperature that is a temperature of cooling water circulated in the working machine or a fluid temperature that is a temperature of hydraulic fluid circulated in the working machine is not less than a predetermined value.

Also, the cooler includes a hydraulic motor to rotate the cooling fan with the hydraulic fluid, a bypass fluid passage connected to inlet and outlet ports of the hydraulic motor, and a hydraulic pressure adjusting unit configured or programmed to adjust a flow rate of the hydraulic fluid through the bypassing fluid passage, and the controller is configured or programmed to change the target fan rotation speed by adjusting the flow rate of the hydraulic fluid by means of the hydraulic pressure adjusting unit.

In another aspect, a working machine includes a prime mover, a hydraulic pump driven by power of the prime mover, a cooler including a cooling fan rotated by either the power of the prime mover or hydraulic fluid delivered from the hydraulic pump, a controller configured or programmed to perform a reduction control for reducing a target fan rotation speed that is a target rotation speed of the cooling fan when an actual prime mover rotation speed that is an actual rotation speed of the prime mover is reduced to a value less than a threshold rotation speed, and to perform, after the reduction control, a restoration control for restoring the target fan rotation speed, and a prime mover rotation setting member configured to output an operation signal to instruct a target prime mover rotation speed that is a target rotation speed of the prime mover. The controller is configured or programmed to control the target prime mover rotation speed based on an instructed prime mover rotation speed that is an instructed rotation speed instructed by the prime mover rotation setting member, and to change the threshold rotation speed in correspondence to variation of the instructed prime mover rotation speed.

Also, the controller is configured or programmed to reduce the threshold rotation speed according to reduction of the instructed prime mover rotation speed.

Also, the controller is configured or programmed to set a plurality of rotation speeds of the prime mover between the threshold rotation speed and the target prime mover rotation speed defined as actual restoration-controlled prime mover rotation speeds, to perform the restoration control to increase the target fan rotation speed in a stepwise manner starting from the smallest one of the plurality of actual restoration-controlled engine rotation speeds, and to define a difference between the maximum rotation speed of the set actual restoration-controlled prime mover rotation speeds and the threshold rotation speed as a fixed value, and change the difference between the maximum rotation speed and the target prime mover rotation speed in correspondence to variation of the instructed prime mover rotation speed.

Also, the controller is configured or programmed to change the difference between the maximum rotation speed and the target prime mover rotation speed in proportion to variation of the instructed prime mover rotation speed.

Also, the plurality of actual restoration-controlled prime mover rotation speeds include at least one intermediate rotation speed between the minimum rotation speed and the maximum rotation speed, and a difference between the threshold rotation speed and the minimum rotation speed is larger than a difference between the minimum rotation speed and the intermediate rotation speed adjoining to the minimum rotation speed.

Also, when the actual prime mover rotation speed is reduced during the restoration control, the controller is configured or programmed to keep the presently set target fan rotation speed until the reduced actual prime mover rotation speed reaches the threshold rotation speed, and to reduce the target fan rotation speed when the reduced actual prime mover rotation speed is less than the threshold rotation speed.

Also, the reduction control is defined as control to reduce the target fan rotation speed to the minimum thereof including a rotation speed of zero.

According to the working machine described above, a target fan rotation speed is suppressed to increase the horsepower available for work when the prime mover is subjected to an overload equal to or larger than a predetermined level, thereby improving workability.

In addition, according to the working machine described above, by changing a threshold rotation speed in accordance with changes in a prime mover indicated rotation speed, thereby achieving both a good performance at high instructed prime mover rotation speed and a good performance at low instructed prime mover rotation speed.

DETAILED DESCRIPTION OF THE PREFERRED EMBODIMENTS

An embodiment of the present invention will be described below with reference to drawings.

Figure 13:
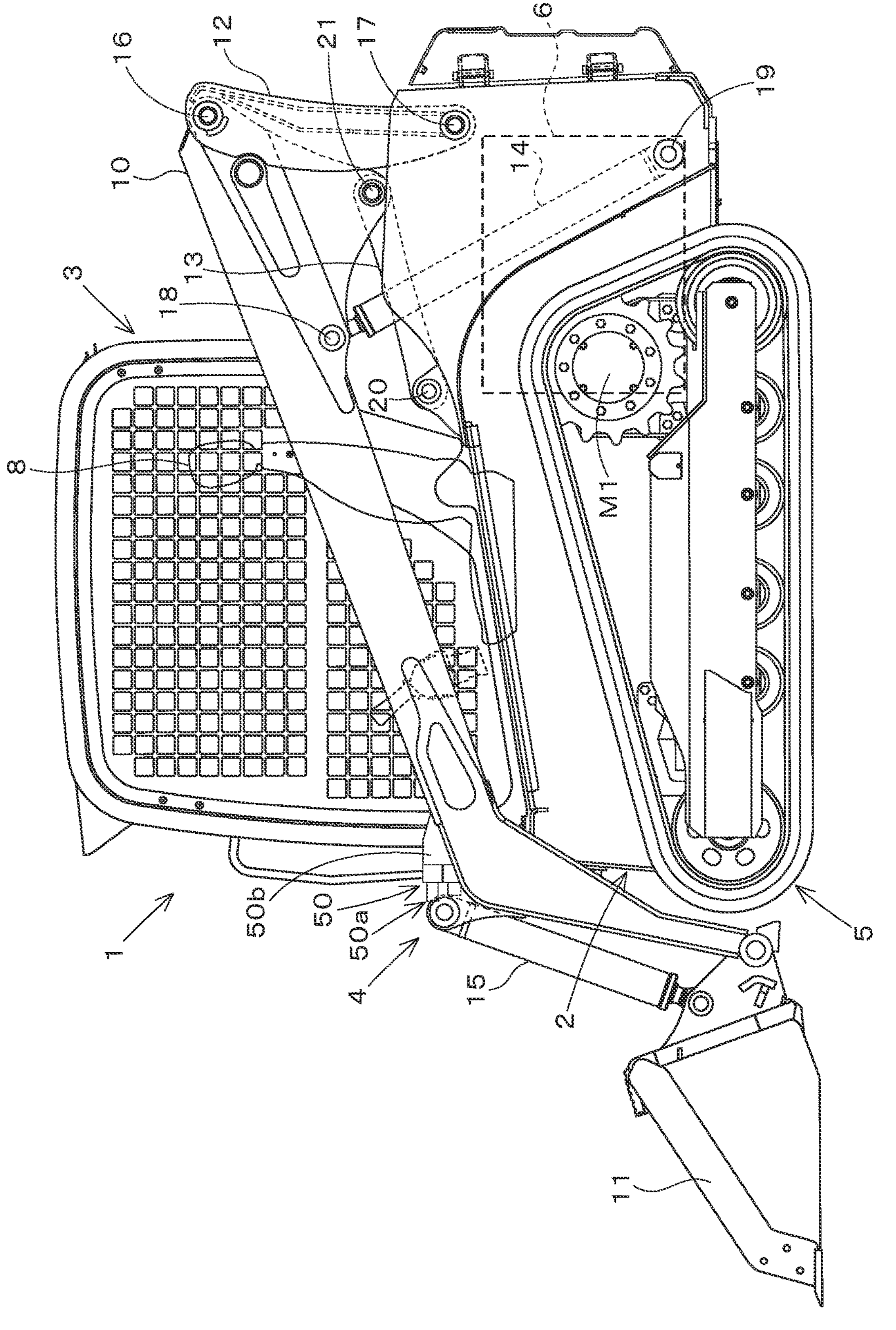
FIG. 13 is a side view of the working machine.

FIG. 13 shows a side view of a working machine 1 according to the present invention. FIG. 13 shows a compact track loader as an example of the working machine 1. However, the working machine 1 is not limited to a compact track loader, and may be another kind of loader, such as a skid steer loader. The working machine 1 may be a working machine other than the loader.

As shown in FIG. 13, the working machine 1 includes a machine body 2, a cabin 3, a working device 4, and a pair of traveling devices 5.

The cabin 3 is mounted on the machine body 2. The cabin 3 incorporates an operator's seat 8 on which an operator sits. The working device 4 is attached to the machine body 2. The pair of traveling devices 5 are disposed on outsides of the machine body 2. A prime mover 6 is mounted internally on a rear portion of the machine body 2.

In the present embodiment, a forward direction from an operator siting on the operator's seat 8 of the working machine 1 (a left side in FIG. 13) is referred to as the front, a rearward direction from the operator (a right side in FIG. 13) is referred to as the rear, a leftward direction from the operator (a front surface side of FIG. 13) is referred to as the left, and a rightward direction from the operator (a back surface side of FIG. 13) is referred to as the right. In addition, a horizontal direction orthogonal to a fore-and-aft direction is referred to as a machine width direction. A direction extending from a center portion of the machine body 2 to the right or left is described as a machine outward direction. In other words, the machine outward direction is equivalent to the machine width direction and separates away from the machine body 2. A direction opposite to the machine outward direction is described as a machine inward direction. In other words, the machine inward direction is equivalent to the machine width direction and approaches the center portion of the machine body 2 in the width direction.

The working device 4 is a hydraulically-driven device, and includes booms 10, a working tool 11, lift links 12, control links 13, boom cylinders 14, and bucket cylinders 15.

The booms 10 are disposed on right and left sides of the cabin 3 swingably up and down. The working tool 11 is a bucket 11, for example. The bucket 11 is disposed at tip portions (front end portions) of the booms 10 movably up and down. The lift links 12 and the control links 13 support base portions (rear portions) of the booms 10 so that the booms 10 can be swung up and down. The boom cylinders 14 are extended and contracted to lift and lower the booms 10. The bucket cylinders 15 are extended and contracted to swing the bucket 11.

Front portions of the right and left booms 10 are connected to each other by a deformed connecting pipe. Base portions (rear potions) of the booms 10 are connected to each other by a circular connecting pipe.

The lift links 12, control links 13, and boom cylinders 14 are arranged on right and left sides of the machine body 2 to correspond to the right and left booms 10, respectively.

The lift links 12 are disposed vertically from rear portions of the base potions of the booms 10. Upper portions (one ends) of the lift links 12 are pivotally supported on the rear portions of the base portions of the booms 10 via respective pivot shafts 16 (first pivot shafts) rotatably around their lateral axes. In addition, lower portions (the other ends) of the lift links 12 are pivotally supported on a rear portion of the machine body 2 via respective pivot shafts 17 (second pivot shafts) rotatably around their lateral axes. The second pivot shafts 17 are disposed below the first pivot shafts 16.

Upper portions of the boom cylinders 14 are pivotally supported via respective pivot shafts 18 (third pivot shafts) rotatably around their lateral axes. The third pivot shafts 18 are disposed at the base portions of the booms 10, especially, at front portions of the base portions. Lower portions of the boom cylinders 14 are pivotally supported via respective pivot shafts 19 (fourth pivot shafts) rotatably around their lateral axes. The fourth pivot shafts 19 are disposed closer to a lower portion of the rear portion of the machine body 2 and below the third pivot shafts 18.

The control links 13 are disposed in front of the lift links 12. One ends of the control links 13 are pivotally supported via respective pivot shafts 20 (fifth pivot shafts) rotatably around their lateral axes. The fifth pivot shafts 20 are disposed on the machine body 2 forward of the lift links 12. The other ends of the control links 13 are pivotally supported via respective pivot shafts 21 (sixth pivot shafts) rotatably around their lateral axes. The sixth pivot shafts 21 are disposed on the booms 10 forwardly upward from the second pivot shafts 17.

By extending and contracting the boom cylinders 14, the booms 10 are swung up and down around the first pivot shafts 16 with the base portions of the booms 10 being supported by the lift links 12 and the control links 13, thereby lifting and lowering the tip end portions of the booms 10. The control links 13 are swung up and down around the fifth pivot shafts 20 according to the vertical swinging of the booms 10. The lift links 12 are swung back and forth around the second pivot shafts 17 according to the vertical swinging of the control links 13.

An alternative working tool instead of the bucket 11 can be attached to the front portions of the booms 10. The alternative working tool is, for example, an attachment (auxiliary attachment) such as a hydraulic crusher, a hydraulic breaker, an angle broom, an earth auger, a pallet fork, a sweeper, a mower or a snow blower.

A connecting member 50 is disposed at the front portion of the left boom 10. The connecting member 50 is a device configured to connect a hydraulic equipment attached to the auxiliary attachment to a piping member such as a pipe disposed on the left boom 10.

The bucket cylinders 15 are arranged close to the front portions of the respective booms 10. The bucket cylinders 15 are extended and contracted to swing the bucket 11.

The pair of traveling devices 5 are hydraulically-driven devices, and are configured to be driven by traveling motors M1 constituted of hydraulic motors. One of the pair of the traveling devices 5 is disposed on the left portion of the machine body 2, and the other one of the pair of the traveling devices 5 is disposed on the right portion of the machine body 2. A crawler type (including semi-crawler type) traveling device is adopted to each of the pair of the traveling devices 5. A wheel-type traveling device having front wheels and rear wheels may also be adopted.

The prime mover 6 is an internal combustion engine such as a diesel engine or a gasoline engine, an electric motor, or the like. In the present embodiment, the prime mover 6 is the diesel engine, but is not limited thereto. Hereafter, the prime mover 6 is referred to as an engine.

Figure 1:
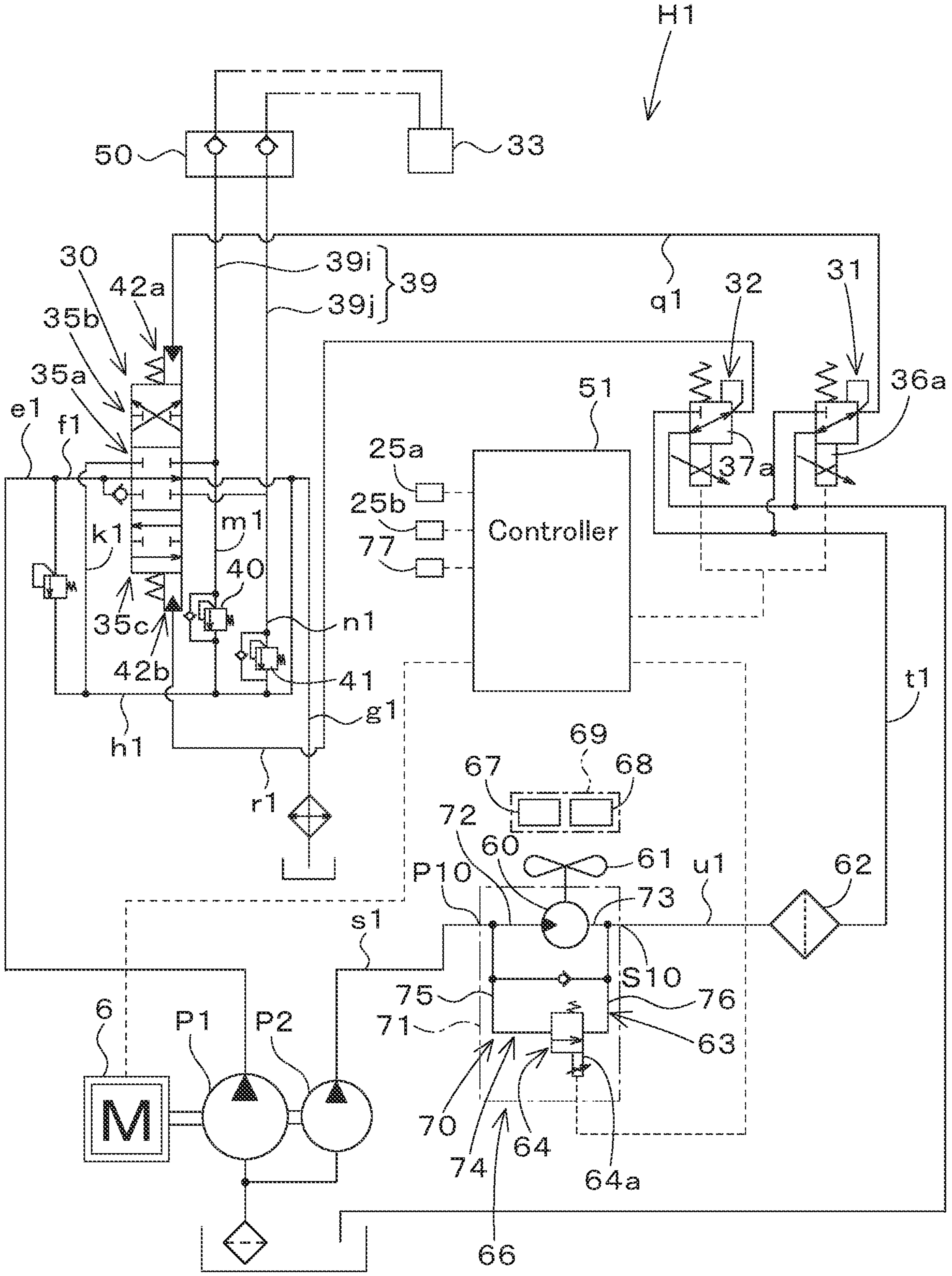
FIG. 1 is a circuit diagram showing a hydraulic control system for a working machine.

Next, FIG. 1 shows a hydraulic control system H1 of the working machine 1.

As shown in FIG. 1, the hydraulic control system H1 includes a first pump P1 (first hydraulic pump) and a second pump P2 (second hydraulic pump). The first pump P1 and the second pump P2 are constant displacement gear pumps configured to be driven by a power of the engine 6, and are hydraulic pumps configured to suck and deliver hydraulic fluid stored in a tank. The first pump P1 is a hydraulic pump configured to deliver the hydraulic fluid that drives the hydraulic actuators. The hydraulic actuators to be driven by the hydraulic fluid delivered from the first pump P1 are, for example, the boom cylinder 14 and the bucket cylinder 15 of the working device 4, the traveling motors M1 of the traveling devices 5, and the hydraulic actuator disposed on the attachment that is mounted in place of the bucket 11. The hydraulic fluid delivered from the second pump P2 is used to supply the hydraulic fluid for signals or controls. For convenience of explanation, the hydraulic fluid for signals or controls may be referred to as pilot fluid, and a pressure of the pilot fluid may be referred to as a pilot pressure.

As shown in FIG. 1, the hydraulic control system H1 includes a control valve (referred to as SP control valve) 30 that controls an attachment 33, and auxiliary solenoid valves (referred to as first solenoid valves) 31 and 32.

The SP control valve 30 is a piloted-operated three-position switching valve with direct-acting spool, that is shiftable by pilot pressure to a neutral position 35*a*, a first position 35*b*, or a second position 35*c*. The SP control valve 30 is returned to the neutral position 35*a* by a spring.

The SP control valve 30 is connected to a working system supply fluid passage f1 that is connected to a delivery fluid passage e1 of the first pump P1. In addition, a bypass fluid passage h1 is connected to the SP control valve 30 via a discharge fluid passage k1, and a drain fluid passage g1 that returns to the tank side is also connected to the SP control valve 30.

In addition, a hydraulic fluid supply passage 39 is connected between the SP control valve 30 and the connecting member 50. The hydraulic fluid supply passage 39 is constituted of two flow passages: a flow passage **39*i* and a flow passage 39*j*. The flow passage 39*i* is connected to the bypass fluid passage h1 via a first relief passage m1, and the flow passage 39*j* is connected to the bypass fluid passage h1 via a second relief passage n1. Relief valves 40 and 41 are provided on the first and second relief passages m1 and n1**, respectively.

The connecting member 50 connects the SP control valve 30 to the attachment 33, and connects the SP control valve 30 to the attachment 33 via the hydraulic fluid supply passage 39, hydraulic hoses and the like. As shown in FIG. 13, the connecting member 50 is constituted of a hydraulic coupler **50*a* disposed in the vicinity of the front portions of the booms 10 and a support member (attachment stay) 50*b* that supports a hydraulic coupler 50*a* on one of the booms 10**.

The first solenoid valves 31 and 32 are a pair of solenoid valves configured to operate the SP control valve 30.

As shown in FIG. 1, the SP solenoid valve 31 is connected to a pressure receiving portion **42*a* of the SP control valve 30 via a first pilot fluid passage q1. The SP solenoid valve 32 is connected to a pressure receiving portion 42*b* of the SP control valve 30 via a second pilot fluid passage r1. The pilot fluid (pressured fluid) from the second pump P2 can be supplied to the SP solenoid valves 31 and 32 via a third fluid passage t1** described below.

Accordingly, when the SP control valve 30 is shifted to the first position **35*b* by the SP solenoid valve 31, the hydraulic fluid from the first pump P1 is supplied from one flow passage 39*i* to the attachment 33, and return fluid from the attachment 33 flows from the other flow passage 39*j* to the drain fluid passage k1**.

In addition, when the SP control valve 30 is shifted to the second position **35*c* by the SP solenoid valve 32, the hydraulic fluid from the first pump P1 is supplied from the other flow passage 39*j* to the attachment 33, and the return fluid from the attachment 33 flows from one flow passage 39*i* to the drain fluid passage k1**.

By operating the first solenoid valves 31 and 32 and the SP control valve 30, the attachment 33 can be operated.

As shown in FIG. 1, the second pump P2 is connected to a fluid passage s1 (referred to as a first fluid passage s1) that is a flow passage through which the hydraulic fluid delivered from the second pump P2 flows. A cooler 66 is disposed downstream of the second pump P2 in the first fluid passage s1. The cooler 66 is a device configured to cool cooled objects 69 such as an oil cooler 67 for cooling the hydraulic fluid and a radiator 68 for cooling the cooling water of the engine 6, and is driven by the hydraulic fluid delivered from the second pump (hydraulic pump) P2.

In other words, the cooler 66 is a device to be driven by a power of the engine 6, and is a device to be driven by a hydraulic pressure generated by the hydraulic pump (second pump P2) driven by the power of the engine 6.

The cooler 66 includes a cooling fan 61 configured to rotate to generate a cooling air, a fan motor 60 configured to be driven to rotate the cooling fan 61, a bypass circuit 70 configured to allow the hydraulic fluid to flow bypassing the fan motor 60, and a motor housing 71 configured to house the fan motor 60 and the bypass circuit 70.

The bypass circuit 70 may be located outside of the motor housing 71 and housed in a valve housing disposed separately from the motor housing 71.

Figure 2:
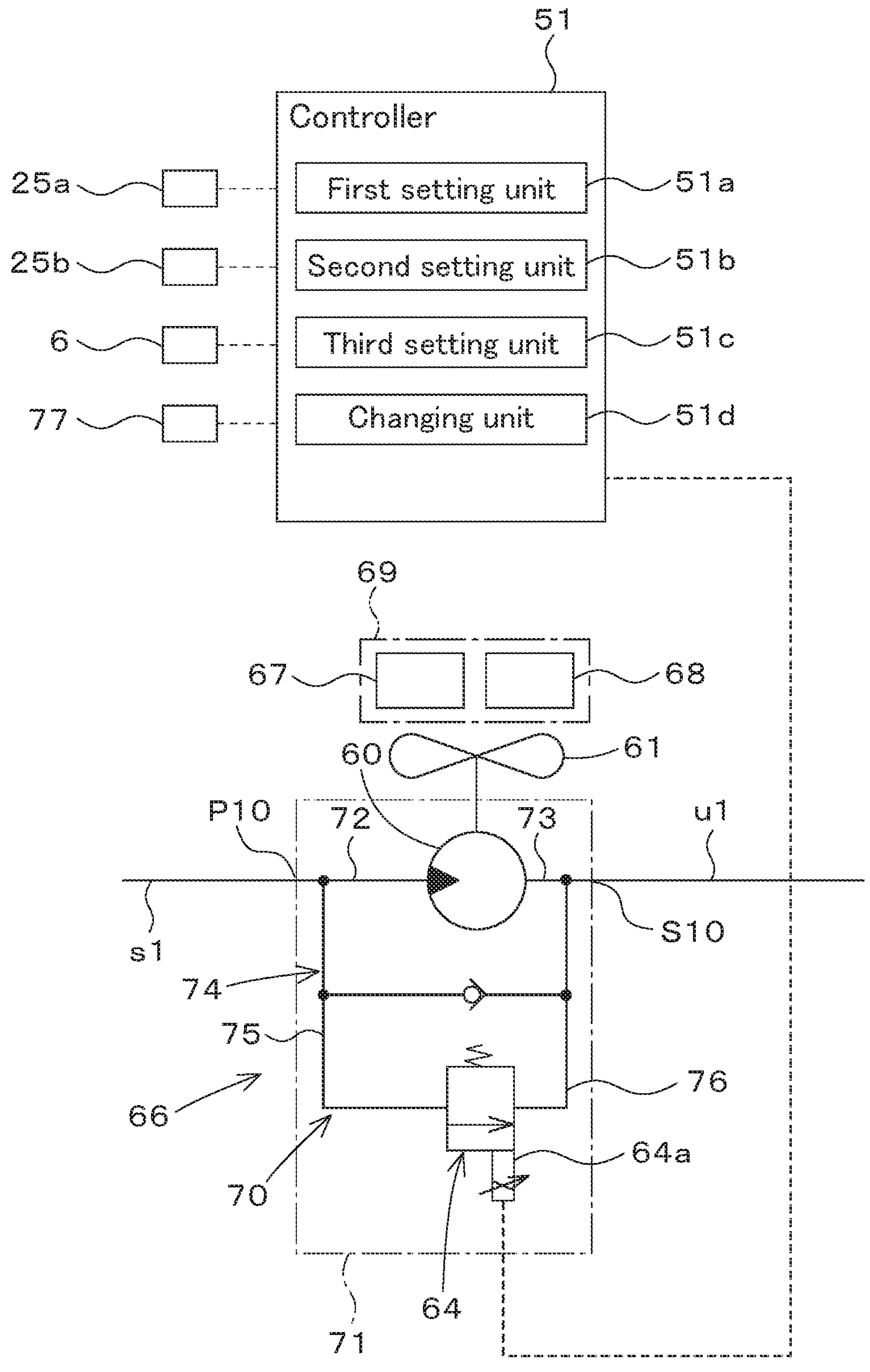
FIG. 2 is an enlarged view of a main portion of the hydraulic control system.

The fan motor 60 is constituted of a hydraulic motor and is driven by the hydraulic fluid delivered from the second pump P2. In detail, as shown in FIG. 2, the first fluid passage s1 is connected to an inlet port P10 of the motor housing 71, the inlet port P10 and an inlet side (primary side) of the fan motor 60 are connected by a connecting fluid passage (referred to as a first connecting fluid passage) 72, and an outlet port S10 of the motor housing 71 and an outlet side (secondary side) of the fan motor 60 are connected by a connecting fluid passage (referred to as a second connecting fluid passage) 73. The hydraulic fluid that flows into the inlet port P10 flows into the fan motor 60 through the first connecting fluid passage 72, and the hydraulic fluid that has flowed through the fan motor 60 flows to the outlet port S10 via the second connecting fluid passage 73. The hydraulic fluid flowing through the fan motor 60 drives the fan motor 60 to rotate the cooling fan 61.

As shown in FIG. 1, the bypass circuit 70 includes a bypass fluid passage 74 connected to the inlet and outlet sides of the fan motor 60, and a hydraulic pressure adjusting unit (bypass relief valve) 64 interposed in the bypass fluid passage 74 and configured to regulate a flow rate of the hydraulic fluid flowing in the bypass fluid passage 74.

As shown in FIG. 2, the bypass fluid passage 74 includes an upstream fluid passage 75 connecting the first connecting fluid passage 72 to the hydraulic pressure adjusting unit 64 and a downstream fluid passage 76 connecting the second connecting fluid passage 73 to the hydraulic pressure adjusting unit 64.

The hydraulic pressure adjusting unit 64 adjusts a flow rate of the hydraulic fluid to be supplied to the fan motor 60. Strictly speaking, the hydraulic pressure adjusting unit 64 is a valve that defines a pressure of the hydraulic fluid delivered from the second pump P2 and supplied to the fan motor 60 and controls (regulates) the pressure of the hydraulic fluid pressure to be supplied to the fan motor 60, thereby consequently regulating a flow rate of the hydraulic fluid flowing in the bypass fluid passage 74.

The hydraulic pressure adjusting unit 64 in the present embodiment is constituted of a solenoid proportional valve (variable relief valve) including a variable solenoid **64*a*. The hydraulic pressure adjusting unit 64 is fully closed by demagnetizing the variable solenoid 64*a*, and most of the hydraulic fluid flowing into the inlet port P10 flows into the fan motor 60. In this manner, a fan rotation speed, which is a rotation speed of the cooling fan 61**, reaches the maximum rotation speed.

In addition, by applying an electric current to the variable solenoid **64*a* of the hydraulic pressure adjusting unit 64, the hydraulic pressure adjusting unit 64 opens, and the hydraulic fluid flowing into the inlet side of the fan motor 60 flows to the outlet side of the fan motor 60 through the bypass fluid passage 74, thereby lowering the fan rotation speed. In detail, by increasing an electric current value to be applied to the variable solenoid 64*a* to open the hydraulic pressure adjusting unit 64, the fan rotation speed is reduced. Then, the fan rotation speed reaches the minimum rotation speed (including zero speed) by fully opening the hydraulic pressure adjusting unit 64**.

As described above, by changing an opening degree of the hydraulic pressure adjusting unit 64 between a full-closing degree and a full-opening degree, a flow rate of the hydraulic fluid flowing into the fan motor 60 can be changed, and accordingly a rotation speed of the cooling fan 61 can be changed.

That is, a flow rate of the hydraulic fluid to be supplied to the fan motor 60 is adjusted by regulating an opening degree of the hydraulic pressure adjusting unit 64.

In other words, a pressure difference between the primary side and the secondary side of the fan motor 60 (a pressure of the hydraulic fluid supply side of the fan motor 60) is set by the hydraulic pressure adjusting unit 64, and the excess fluid generated by the hydraulic fluid from the second pump P2 exceeding the above-mentioned set pressure flows through the upstream fluid passage 75, the hydraulic pressure adjusting unit 64, the downstream fluid passage 76 in the order to bypass the fan motor 60, thereby controlling a flow rate of the hydraulic fluid to be supplied to the fan motor 60.

As shown in FIG. 1, a fluid passage u1 (referred to as a second fluid passage u1) is connected to the outlet port S10, a filter 62 for filtrating the hydraulic fluid is connected to the second fluid passage u1, and a fluid passage t1 (third fluid passage t1) for supplying the hydraulic fluid to the first solenoid valves 31 and 32 is connected to a portion downstream of the filter 62.

As shown in FIG. 1, the hydraulic control system H1 includes a controller 51. The controller 51 is configured using a microcomputer with, for example, a CPU (Central Processing Unit) and an EEPROM (Electrically Erasable Programmable Read-Only Memory). An attachment operation member 25*a* and a prime mover rotation setting member (prime mover rotation setting member) 25*b* are connected to the controller 51. The attachment operation member 25*a* and the prime mover rotation setting member 25*b* are constituted of switches, levers, or the like. The attachment operation member 25*a* is an operation member for operating the attachment 33.

The prime mover rotation setting member 25*b* is an operation member for determing a target engine rotation speed (target prime mover rotation speed), which is a target rotation speed of the engine 6. In detail, the engine rotation speed setting member 25*b* is a member for the operator to instruct the target engine rotation speed, and outputs, to the controller 51, an operation signal corresponding to an instructed engine rotation speed (instructed prime mover rotation speed) that is an indicated speed.

As shown in FIG. 1, the engine 6 is connected to the controller 51. The controller 51 is capable of obtaining an actual engine rotation speed (actual prime mover rotation speed) that is an actual rotation speed of the engine 6.

In addition, the controller 51 controls the target engine rotation speed. That is, the operation signal (operation amount) of the engine rotation speed setting member 25*b* is input to the controller 51, and the controller 51 outputs, to the engine 6, a control signal to set the target engine rotation speed that is a rotation speed corresponding to the operation amount of the engine rotation speed setting member 25*b*. The engine 6 receives this control signal to control the target engine rotation speed to be the target engine rotation speed corresponding to the instructed engine rotation speed that is an instructed rotation speed instructed by the engine rotation speed setting member 25*b*.

As shown in FIG. 1, the controller 51 is connected to a measurement device 77 configured to measure either or both of a fluid temperature of the hydraulic fluid circulating in the working machine 1 and a water temperature of the cooling water. The controller 51 is capable of obtaining one or both of the temperatures of the hydraulic fluid and the temperature of the cooling water.

As shown in FIG. 1, the controller 51 is connected to a variable solenoid 64*a* of the hydraulic pressure adjusting unit 64. That is, the controller 51 controls an opening degree of the hydraulic pressure adjusting unit 64 by demagnetizing the variable solenoid 64*a* or applying an electric current to the variable solenoid 64*a*. The controller 51 is connected to the solenoids 36*a* and 37*a* of the first solenoid valves 31 and 32. The controller 51 controls the first solenoid valves 31 and 32.

As a conventional problem, in heavy load work that applies a large load to the engine 6, horsepower is consumed by the cooler 66, and accordingly the horsepower allocated to the working device 4 and the traveling devices 5 is reduced, which leads to a deterioration of workability.

In the present embodiment, in order to improve workability, when a load applied to the engine 6 increases and the actual engine rotation speed reduces, the controller 51 performs a reduction control to reduce the target fan rotation speed that is a target rotation speed of the cooling fan 61. In detail, the controller 51 performs the reduction control when a load applied to the engine 6 becomes large and the actual engine rotation speed is reduced more than a threshold rotation speed relative to the target engine rotation speed. By reducing the target fan rotation speed and suppressing horsepower consumption consumed by the cooler 66 in heavy load work, the horsepower allocated to the working device 4 and the traveling device 5 can be increased, and thus the workability can be improved.

A reduction control to reduce the target fan rotation speed may be performed when the actual engine rotation speed is reduced to be less than the threshold rotation speed with no comparison to the target engine rotation speed.

In addition, when the actual engine rotation speed is increased to be not less than the threshold rotation speed, the controller 51 performs a restoration control to restore the target fan rotation speed, after the reduction control, in order to increase the target fan rotation speed to improve the cooling performance by the cooling fan 61.

Figure 3:
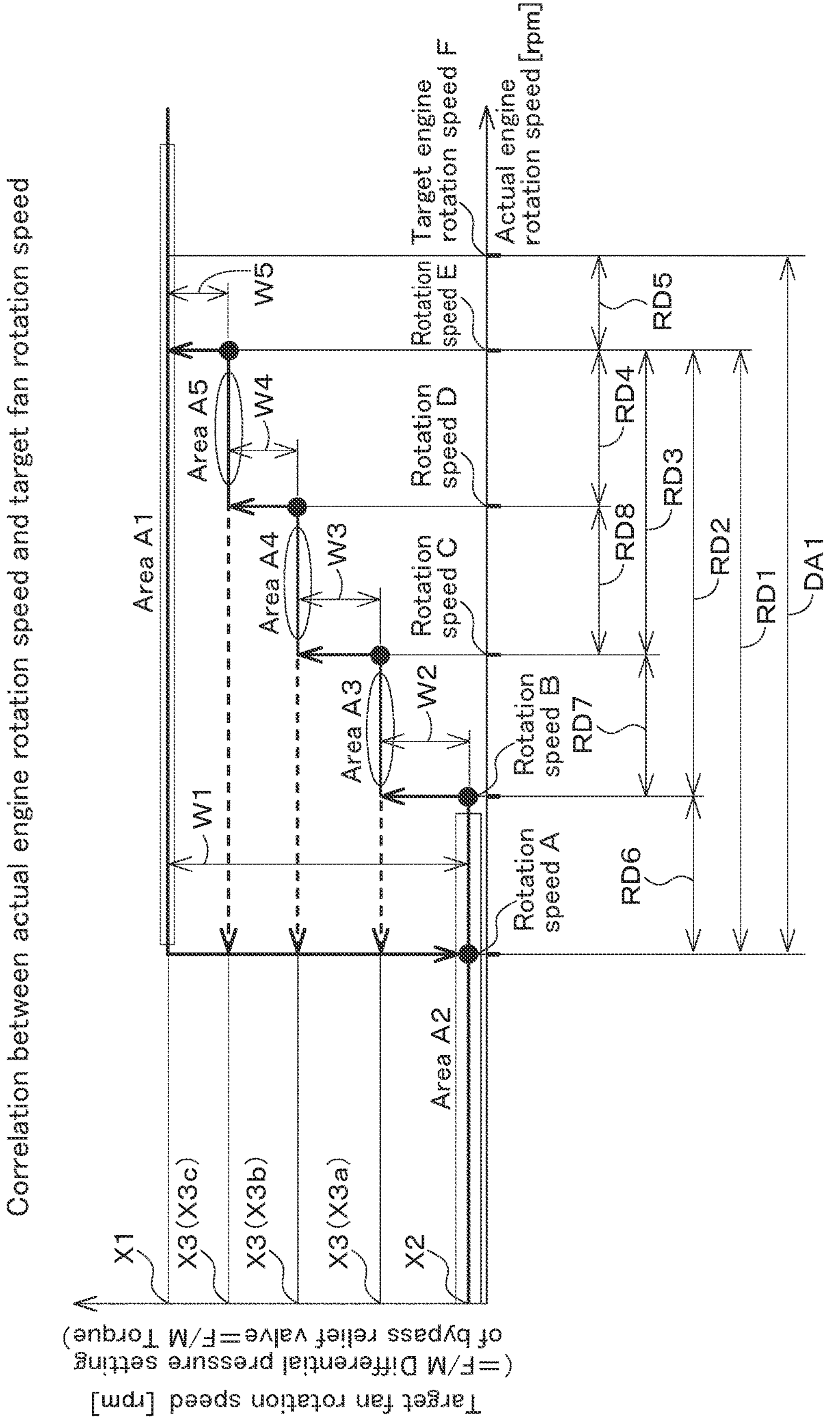
FIG. 3 is a correlation diagram between an actual engine rotation speed and a target fan rotation speed.

For example, as shown in FIG. 3, the controller 51 in the reduction control reduces the target fan rotation speed from a rotation speed corresponding to an area A1 to a rotation speed corresponding to an area A2, and in the restoration control, the controller 51 increases (restore) the target fan rotation speed from the rotation speed corresponding to the area A2 to the rotation speeds corresponding to each of the areas A3, A4, and A5 in this order.

Next, with reference to FIGS. 2 and 3, the reduction control and the restoration control of the target fan rotation speed will be described in detail. FIG. 2 shows a control system of the cooler 66. FIG. 3 is a view showing a correlation between the actual engine rotation speed and the target fan rotation speed, where a horizontal axis shows the actual engine rotation speed and a vertical axis shows the target fan rotation speed (equivalent to a differential pressure setting of a bypass relief valve).

As shown in FIG. 2, the controller 51 includes a first setting unit 51*a* configured to set the target fan rotation speed when the actual engine rotation speed has not been reduced to be less than the threshold rotation speed, a second setting unit 51*b* configured to set the target fan rotation speed employed when the reduction control is to be performed, and a third setting unit 51*b* configured to set the target fan rotation speed employed when the restoration control is to be performed.

The first setting unit 51*a* sets the target fan rotation speed to a first target fan rotation speed X1 (see FIG. 3). The second setting unit 51*b* sets a second target fan rotation speed X2 (see FIG. 3) for the reduction control to a rotation speed smaller than the first target fan rotation speed X1 set by the first setting unit 51*a*. In the present embodiment, the second setting unit 51*b* sets the target fan rotation speed to the second target fan rotation speed X2 that is the minimum rotation speed. As a control to set the target fan rotation speed to the second target fan rotation speed X2, the hydraulic pressure adjusting unit 64 is fully opened. The third setting unit 51*c* sets the target fan rotation speed to a third target fan rotation speed X3 (see FIG. 3) that is a rotation speed not less than the second target fan rotation speed X2 and less than the first target fan rotation speed X1. As a control to set the target fan rotation speed to the third target fan rotation speed X3, an opening degree of the hydraulic pressure adjusting unit 64 is regulated between a full-opening degree and a full-closing degree.

In FIG. 3, a rotation speed A represents the threshold rotation speed. The rotation speeds B to E represent a plurality of actual restoration-controlled engine rotation speeds (actual restoration-controlled prime mover rotation speeds) set between the threshold rotation speed and the engine target rotation speed F. The rotation speed B is the minimum rotation speed among the plurality of actual restoration-controlled engine rotation speeds. The rotation speed E is the maximum rotation speed among the plurality of the actual restoration-controlled engine rotation speeds. A rotation speed C and rotation speed D are intermediate rotation speeds defined between the maximum rotation speed (rotation speed E) and the minimum rotation speed (rotation speed B). There need only be at least one intermediate rotation speed, and there may be three or more.

Next, the reduction control of the target fan rotation speed will be explained in detail.

As shown in FIG. 3, until the actual engine rotation speed reaches the rotation speed A (threshold rotation speed) from the target engine rotation speed F, the target fan rotation speed stays in the area A1, and the controller 51 (first setting unit 51*a*) maintains the target fan rotation speed at the first target fan rotation speed X1 to improve the cooling performance.

When the actual engine rotation speed is reduced, the actual fan rotation speed is reduced due to the reduction of the actual engine rotation speed. Accordingly, in the present embodiment, the "target fan rotation speed" on the vertical axis of FIG. 3 is a differential pressure setting of the bypass relief valve (variable relief valve), which is the hydraulic pressure adjusting unit 64, and the term "target fan rotation speed" is used for convenience of explanation.

When the engine 6 is overloaded and the actual engine rotation speed drops to a rotation speed A, the controller 51 (second setting unit 51*b*) shifts the target fan rotation speed to the area A2. In the area A2, the controller 51 (second setting unit 51*b*) sets the target fan rotation speed to the second target fan rotation speed X2. As a result, the horsepower to be consumed by the cooler 66 can be used for the working device 4 and the traveling devices 5, thereby improving the workability. In the area A2, when the actual engine rotation speed is lower than the rotation speed A, the controller 51 maintains the target fan rotation speed at the second target fan rotation speed X2.

In the above-described reduction control, the temperature rising of the cooled objects 69 is suppressed with the cooling fan 61 rotating at a high speed when a small load is applied to the engine 6, and an extra power to reduce the rotation of the cooling fan 61 is left when a heavy load is applied to the engine 6 becomes high, thereby performing the control even in a high temperature outside-air environment.

Next, the restoration control of the target fan rotation speed will be explained in detail.

The controller 51 (third setting unit 51*c*) sets the third target fan rotation speed X3, which is the target fan rotation speed in the restoration control, to a rotation speed not less than the second target fan rotation speed X2 and less than the first target fan rotation speed X1. In the present embodiment, the third setting unit 51*c* sets a plurality of the third target fan rotation speeds X3 between the second target fan rotation speed X2 and the first target fan rotation speed X1. That is, in the restoration control according to the present embodiment, the target fan rotation speed is restored in a stepwise manner.

Accordingly, in the reduction control, the target fan rotation speed is dropped from the first target fan rotation speed X1 to the second target fan rotation speed X2 at once; however, in the restoration control, the change speed of the target fan rotation speed is set more slowly than that in the reduction control. In other words, the controller 51 makes an increase rates (increase ranges) W2, W3, W4, and W5 of the target fan rotation speed in the restoration control different from a reduction rate (reduction range) W1 of the target fan rotation speed in the reduction control.

As shown in FIG. 3, in the present embodiment, the plurality of third target fan rotation speeds X3 set by the third setting unit 51*c* are, in ascending order, a third-a target fan rotation speed 3Xa, a third-b target fan rotation speed 3Xb, and a third-c target fan rotation speed 3Xc. That is, the third-a target fan rotation speed 3Xa is larger than the second target fan rotation speed X2 and smaller than the third-b target fan rotation speed 3Xb, the third-b target fan rotation speed 3Xb is smaller than the third-c target fan rotation speed 3Xc, and the third-c target fan rotation speed 3Xc is smaller than the first target fan rotation speed X1.

In the present embodiment, the restoration control is performed to increase the target fan rotation speed in a stepwise manner starting from the smallest one of the plurality of actual restoration-controlled engine rotation speeds. This configuration will be explained in detail below.

In the area A2, when the actual engine rotation speed is restored (increased) from the speed A to the rotation speed B, the controller 51 shifts the target fan rotation speed so as to shift to the area A3. In the area A3, the controller 51 (third setting unit 51*c*) increases the target fan rotation speed from the second target fan rotation speed X2 to the third-a target fan rotation speed X3*a*. Thereafter, when the actual engine rotation speed is restored to the rotation speed C, the controller 51 (third setting unit 51*c*) shifts the target fan rotation speed so as to shift to the area A4. In the area A4, the controller 51 (third setting unit 51*c*) increases the target fan rotation speed from the third-a target fan rotation speed X3*a* to the third-b target fan rotation speed X3*b*. Then, when the actual engine rotation speed is restored to a rotation speed D, the controller 51 shifts the target fan rotation speed so as to shift to the area A5. In the area A5, the controller 51 (third setting unit 51*c*) increases the target fan rotation speed from the third-b target fan rotation speed X3*b* to the third-c target fan rotation speed X3*c*. Thereafter, when the actual engine rotation speed is restored to the rotation speed E, the controller 51 (third setting unit 51*c*) shifts the target fan rotation speed so as to shift to the area A1, and the target fan rotation speed is restored (increased) to the first target fan rotation speed X1.

In addition, when the actual engine rotation speed is reduced in the restoration control, the controller 51 maintains the current target fan rotation speed until the actual engine rotation speed reaches a threshold rotation speed (rotation speed A), and when the actual engine rotation speed is reduced by the threshold rotation speed (rotation speed A) or more (see a dotted line in FIG. 3), the controller 51 reduces the target fan rotation speed to the second target fan rotation speed X2. Specifically, when the actual engine rotation speed is reduced in any one of the areas A3 to A5, the current target fan rotation speed in the area A3, A4 or A5 is maintained until the actual engine rotation speed is reduced to the rotation speed A, and the current target fan rotation speed is shifted to that in the area A2 when the reduced rotation speed reaches the rotation speed A.

As described above, the controller 51 makes the increase rates W2, W3, W4, and W5 of the target fan rotation speed in the restoration control different from the reduction rate W1 of the target fan rotation speed in the reduction control. Specifically, the controller 51 makes the increase rates W2, W3, W4, and W5 of the target fan rotation speed in the restoration control smaller than the reduction rate W1 of the target fan rotation speed in the reduction control. Moreover, in detail, the change speed of the target fan rotation speed is set faster in the reduction control (when shifting to the area A2 from other areas (area A1, area A3, area A4, area A5)) and is set slower in the restoration control (when shifting to area A2, area A3, area A4, area A5, and area A1 in the order). In other words, in the restoration control, the change speed of the target fan rotation speed is restored slowly.

In the restoration control, in a case where the target fan rotation speed is restored after the actual engine rotation speed drops to the rotation speed A, the restoration of the engine 6 can be hastened by restoring the target fan rotation speed slowly, that is, by suppressing the horsepower consumed by the cooler 66. As a result, the workability can be improved.

Next, a relationship between the rotation speed E and each of the rotation speeds A to D, the target engine rotation speed F and the instructed engine rotation speed will be explained with numerical values. The numerical values shown below are just examples, and are not limited to this description.

In the present embodiment, as shown in FIG. 3, a first rotation speed difference RD1, which is a difference between the rotation speed E and the rotation speed A, is set to 350 rpm. A second rotation speed difference RD2, which is a difference between the rotation speed E and the rotation speed B, is set to 150 rpm. A third rotation speed difference RD3, which is a difference between the rotation speed E and the rotation speed C, is set to 100 rpm. And, a fourth rotation speed difference RD4, which is a difference between the rotation speed E and the rotation speed D, is set to 50 rpm. These first to fourth speed differences RD1 to RD4 are fixed values.

A fifth rotation speed difference RD5, which is a difference between the target engine rotation speed F and the rotation speed E, may also be a fixed value. However, when the fifth rotation speed difference RD5 is a fixed value, it may be difficult to achieve good performance in both high and low instructed engine rotation speeds.

For example, when the fifth rotation speed difference RD5 is set to 350 rpm, a dropping amount DA1 in the reduction control, which is a difference between the target engine rotation speed F and the rotation speed A, will be 700 rpm. When the fifth rotation speed difference RD5 is fixed regardless of the instructed engine rotation speed, the target engine rotation speed F will drop to the rotation speed A with dropping of about 30% when the instructed engine rotation speed is 2400 rpm, whereas when the instructed engine rotation speed is 1150 rpm, the target engine rotation speed F cannot reach the rotation speed A without dropping of about 60%, which may cause the engine to stall easily.

Figure 4A:
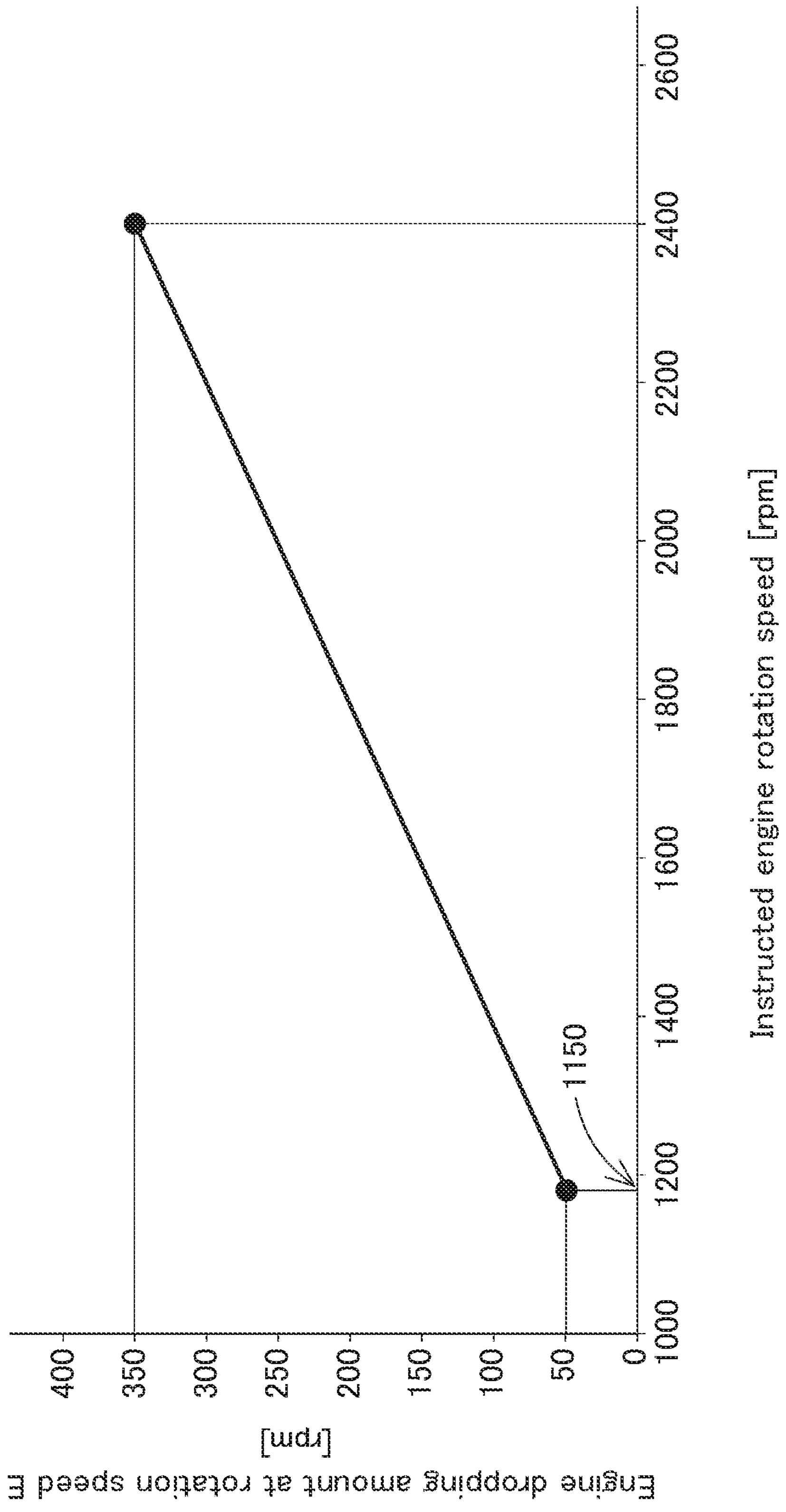
FIG. 4A is a graph showing a relationship between an instructed engine rotation speed and an engine dropping amount.

Accordingly, in the present embodiment, as shown in FIG. 2, the controller 51 includes a changing unit 51*d* configured to change the fifth rotation speed difference RD5 in accordance with the change in the instructed engine rotation speed. A relationship between the instructed engine rotation speed and the fifth rotation speed difference RD5 is shown in FIG. 4A. FIG. 4A shows the instructed engine rotation speed on the horizontal axis and the fifth rotation speed difference RD5 (engine dropping amount at the rotation speed E) on the vertical axis.

As shown in FIG. 4A, the controller 51 sets the fifth rotation speed difference RD5 to 350 rpm when the instructed engine rotation speed is 2400 rpm, and sets the fifth rotation speed difference RD5 to 50 rpm when the instructed engine rotation speed is 1150 rpm. When the instructed engine rotation speed is changed from 1150 rpm to 2400 rpm, the fifth rotation speed difference RD5 is changed from 50 rpm to 350 rpm in proportion to the instructed engine rotation speed.

Here, since the first to fourth rotation speed differences RD1 to RD4 are fixed values, the rotation speed A, which is a threshold rotation speed, is changed when the fifth rotation speed difference RD5 is changed. That is, the controller 51 changes the rotation speed A (threshold rotation speed) in accordance with the change in the instructed engine rotation speed set by the prime mover rotation setting member 25*b*. In detail, the controller 51 makes the threshold rotation speed (rotation speed A) smaller as the instructed engine rotation speed becomes smaller. Accordingly, the threshold rotation speed (rotation speed A) can be varied to an optimum value according to the instructed engine rotation speed, thereby suppressing the engine stalling.

Figure 4B:
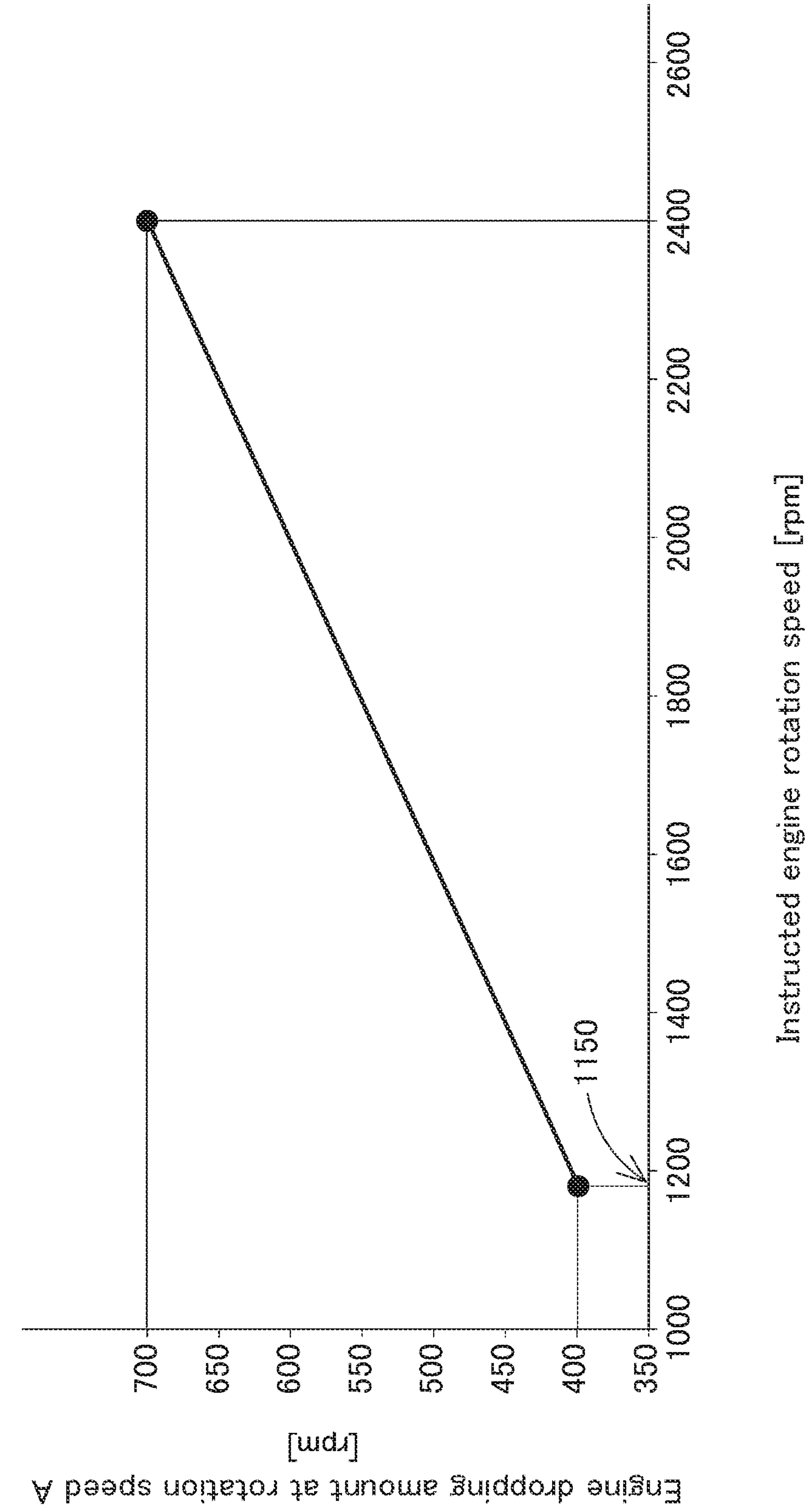
FIG. 4B is a graph showing a relationship between the instructed engine rotation speed and the engine dropping amount.

FIG. 4B shows a relationship between the instructed engine rotation speed and the dropping amount DA1 (engine dropping amount at the rotation speed A) in the reduction control, the dropping amount DA1 being a difference between the target engine rotation speed F and rotation speed A. As shown in FIG. 4B, the dropping amount DA1 is 700 rpm when the instructed engine rotation speed is 2400 rpm. The dropping amount DA1 is 400 rpm when the instructed engine rotation speed is 1150 rpm. When the instructed engine rotation speed is changed from 1150 rpm to 2400 rpm, the dropping amount DA1 is changed proportionally from 400 rpm to 700 rpm depending on the instructed engine rotation speed. The slope of the graph is the same as that in FIG. 4A.

In the present embodiment, since the first rotation speed difference RD1 is 350 rpm and the second rotation speed difference RD2 is 150 rpm, a sixth rotation speed difference RD6, which is a difference between the rotation speed A and the rotation speed B, is 200 rpm. In addition, a seventh rotation speed difference RD7 which is a difference between rotation speed B and rotation speed C, an eighth rotation speed difference RD8 which is a difference between rotation speed C and rotation speed D, and the fourth rotation speed difference RD4 are each 50 rpm. That is, a difference between the threshold rotation speed (rotation speed A) and the minimum rotation speed (rotation speed B) of the actual restoration-controlled engine rotation speed is sufficiently larger than a difference between the minimum rotation speed (rotation speed B) and an intermediate rotation speed (rotation speed C) of the actual restoration-controlled engine rotation speed adjoining to the minimum rotation speed (rotation speed B), and than a difference between the adjoining intermediate speeds (rotation speed D and rotation speed C, rotation speed E and rotation speed D).

By keeping the difference between rotation speed A and rotation speed B sufficiently large, that is, by keeping the difference at 200 rpm in the present embodiment, hunting of the control due to the actual engine rotation speed varied back and forth between the rotation speed A and the rotation speed B can be suppressed.

The above description explains the control of the target fan rotation speed for the changes in the actual engine rotation speed, and the controller 51 also controls the target fan rotation speed for the changes in temperatures of the cooled objects 69.

Next, referring to FIG. 5A, the control of the target fan rotation speed for the changes in the temperatures of the cooled objects 69 will be described. In the following example, a case in which the target fan rotation speed is controlled based on a fluid temperature is described; however, the target fan rotation speed may be similarly controlled based on a water temperature. That is, each of the first setting unit 51*a*, the second setting unit 51*b*, and the third setting unit 51*c* may control the target fan rotation speed based on either the fluid temperature or the water temperature measured by the measurement device 77.

The target fan rotation speed may be controlled based on both the water temperature and the fluid temperature measured by the measurement device 77. In that case, the higher one of the target fan rotation speed set based on the water temperature of the cooling water circulating the working machine 1 and the target fan rotation speed set based on the fluid temperature of the hydraulic fluid circulating the working machine 1 may be chosen.

Figure 5A:
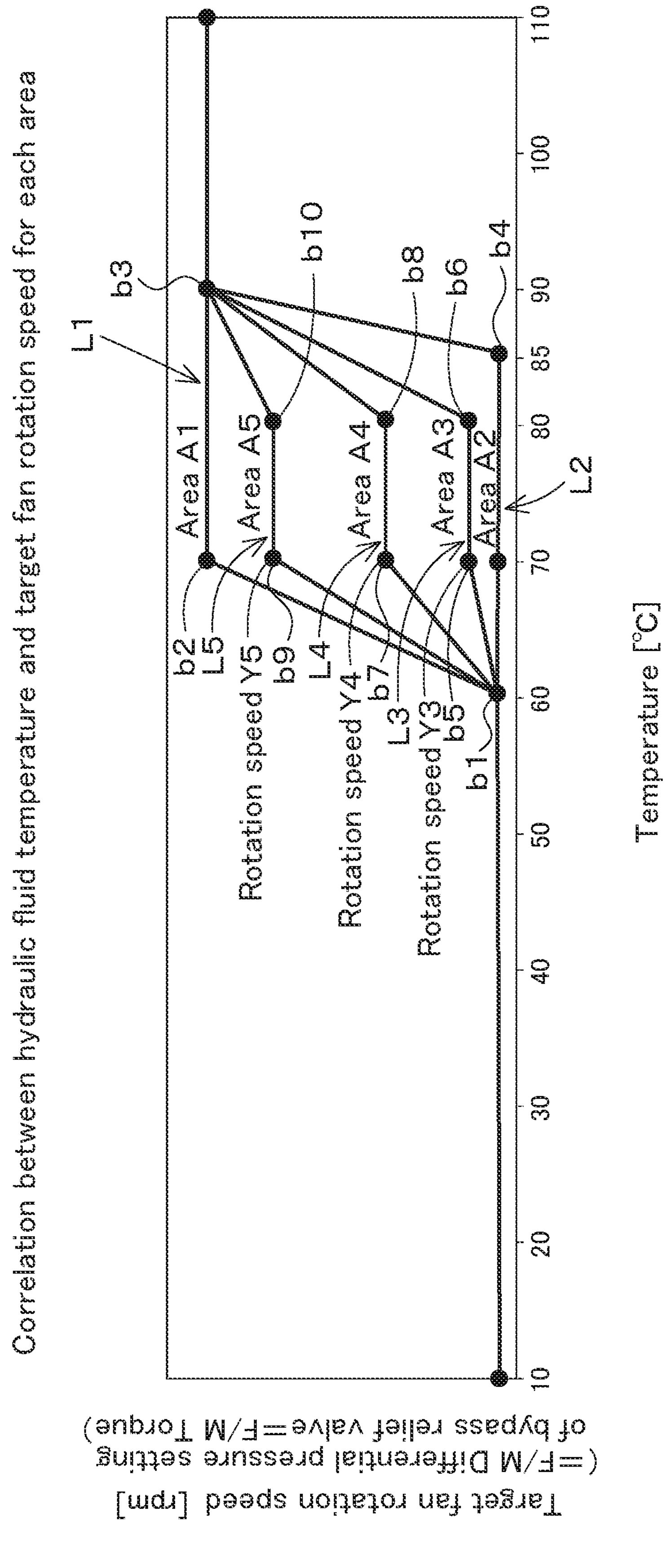
FIG. 5A is a correlation diagram between a hydraulic fluid temperature and a target fan rotation speed for each area.

FIG. 5A is a view showing a correlation between the fluid temperature (hydraulic fluid temperature) and the target fan rotation speed for each of the areas A1, A2, A3, A4, and A5, with the temperature of the hydraulic fluid shown on the horizontal axis and the target fan rotation speed shown on the vertical axis. The first setting unit 51*a*, the second setting unit 51*b*, and the third setting unit 51*c* each set the target fan rotation speed based on the fluid temperature and the areas A1, A2, A3, A4, and A5 shown in FIG. 5A. Note that the numerical values shown below are just examples and are not limited thereto.

As shown in FIG. 5A, when the fluid temperature is 60° C. or lower, the target fan rotation speed is the minimum rotation speed in each of the areas A1 to A5.

On a line L1 that defines the target fan rotation speed in the area A1, the target fan rotation speed is proportionally increased from the minimum rotation speed to the maximum rotation speed according to the temperature rising when the fluid temperature is between 60° C. (point b1) and 70° C. (point b2), and the target fan rotation speed is fixed to the maximum rotation speed when the fluid temperature is 70° C. or higher.

On a line L5 that defines the target fan rotation speed in the area A5, the target fan rotation speed is proportionally increased according to the temperature rising from the minimum rotation speed to a rotation speed Y5, which is lower than the maximum rotation speed, when the fluid temperature is between 60° C. (point b1) and 70° C. (point b9). The target fan rotation speed is fixed to the rotation speed Y5 when the fluid temperature is between 70° C. (point b9) and 80° C. (point b10). The target fan rotation speed is proportionally increased from the rotation speed Y5 to the maximum rotation speed according to the temperature rising when the fluid temperature is between 80° C. (point b10) and 90° C. (point b3), and the target fan rotation speed is fixed to the maximum rotation speed when the fluid temperature is 90° C. or higher.

On a line L4 that defines the target fan rotation speed in the area A4, the target fan rotation speed is proportionally increased according to the temperature rising to a rotation speed Y4, which is lower than the rotation speed Y5, when the fluid temperature is between 60° C. (point b1) and 70° C. (point b7). The target fan rotation speed is fixed to the rotation speed Y4 when the fluid temperature is between 70° C. (point b7) and 80° C. (point b8). The target fan rotation speed is proportionally increased from the rotation speed Y4 to the maximum rotation speed according to the temperature rising when the fluid temperature is between 80° C. (point b8) and 90° C. (point b3), and the target fan rotation speed is fixed to the maximum rotation speed when the fluid temperature is 90° C. or higher.

On a line L3 that defines the target fan rotation speed in the area A3, the target fan rotation speed is proportionally increased according to the temperature rising to a rotation speed Y3, which is lower than the rotation speed Y4, when the fluid temperature is between 60° C. (point b1) and 70° C. (point b5). The target fan rotation speed is fixed to the rotation speed Y3 when the fluid temperature is between 70° C. (point b5) and 80° C. (point b6). The target fan rotation speed is proportionally increased from the rotation speed Y3 to the maximum rotation speed according to the temperature rising when the fluid temperature is between 80° C. (point b6) and 90° C. (point b3), and the target fan rotation speed is fixed to the maximum rotation speed when the fluid temperature is 90° C. or higher.

On a line L2 that defines the target fan rotation speed in the area A2, the target fan rotation speed is maintained at the minimum rotation speed until the fluid temperature rises to 85° C. (point b4). Then, the target fan rotation speed is proportionally increased from the minimum rotation speed to the maximum rotation speed according to the temperature rising when the fluid temperature is between 85° C. (point b4) and 90° C. (point b3), and the target fan rotation speed is fixed to the maximum rotation speed when the fluid temperature is 90° C. or higher.

As shown in FIG. 5A, the temperature at the point b4, where the target fan rotation speed starts to be increased from the minimum rotation speed on the line L2, is set to be higher than the temperatures at the points b6, b8 and b10.

In the above control, when the temperatures of the cooled objects 69 becomes high, the target fan rotation speeds in the area A3, area A4, and area A5 is initially increased to mitigate the temperature rising of the cooled objects 69.

Then, when the temperature rises further, the target fan rotation speed in the area A2 is increased.

Finally, all the target fan rotation speeds in the areas A1 to A5 are fixed at the maximum rotation speed. That is, the controller 51 does not perform the reduction control when the fluid temperature (or water temperature) is a certain level or more, thereby preventing the overheating.

As shown in FIG. 5A, when the fluid temperature is a preliminarily-determined temperature (predetermined temperature), the first setting unit 51*a* sets a value corresponding to the predetermined temperature on the line L1 to the first target fan rotation speed X1. When the fluid temperature is the predetermined temperature (predetermined temperature), the second setting unit 51*b* sets a value corresponding to the predetermined temperature in line L2 to the second target fan rotation speed X2. Since a section from the point b1 to the point b2 on the line L1 is inclined, the reduction rate W1, which is a difference between the first target fan rotation speed X1 and the second target fan rotation speed X2, becomes smaller as the temperature becomes lower.

When the fluid temperature is a preliminarily-determined temperature (predetermined temperature), the third setting unit 51*c* sets values corresponding to the predetermined temperature to the third target fan rotation speed X3 on each of the lines L3, L4, and L5.

The difference between the second target fan rotation speed X2, which is set in the section defined by the point b1, point b4, and point b3 on line L2, and the third-a target fan rotation speed X3*a*, which is set in a section defined by the point b1, point b5, point b6, and point b3 on line L3, is set by the third setting unit 51*c* to the increase rate W2.

The difference between the third-a target fan rotation speed X3*a*, which is set in the section defined by the point b1, point b5, point b6, and point b3 on the line L3, and the third-b target fan rotation speed X3*b*, which is set in the section defined by the point b 1, point b7, point b8, and point b3 on line L4, is set by the third setting unit 51*c* to the increase rate W3.

The difference between the third-b target fan rotation speed X3*b*, which is set in the section defined by the point b1, point b7, point b8, and point b3 on the line L4, and the third-c target fan rotation speed X3*c*, which is set in the section defined by the point b1, point b9, point b10, and point b3 on line L5, is set by the third setting unit 51*c* to the increase rate W4.

The difference between the third-c target fan rotation speed X3*c*, which is set in the section defined by the point b1, point b9, point b10, and point b3 on the line L5, and the first target fan rotation speed X1, which is set in the section defined by the point b1, point b2, and point b3 on line L1, is set by the third setting unit 51*c* to the increase rate W5.

That is, according to the above control, the first setting unit 51*a*, the second setting unit 51*b*, and the third setting unit 51*c* set the first target fan rotation speed X1, the second target fan rotation speed X2, and the third target fan rotation speed X3, respectively, based on the fluid temperature measured by the measurement device 77.

In addition, in FIG. 5A, in the temperature range between 60° C. and 70° C., the third setting unit 51*c* increases the increase rates W2, W3, W4, and W5 of the third target fan rotation speed X3 as the fluid temperature measured by the measurement device 77 increases.

In the temperature range between 70° C. and 80° C., the increase rates W2, W3, W4, and W5 of the third target fan rotation speed X3 are kept substantially constant even when the fluid temperature increases, and in the temperature range between 80° C. and 90° C., the increase rates W2, W3, W4, and W5 of the third target fan rotation speed X3 is made smaller as the fluid temperature increases.

Figure 5B:
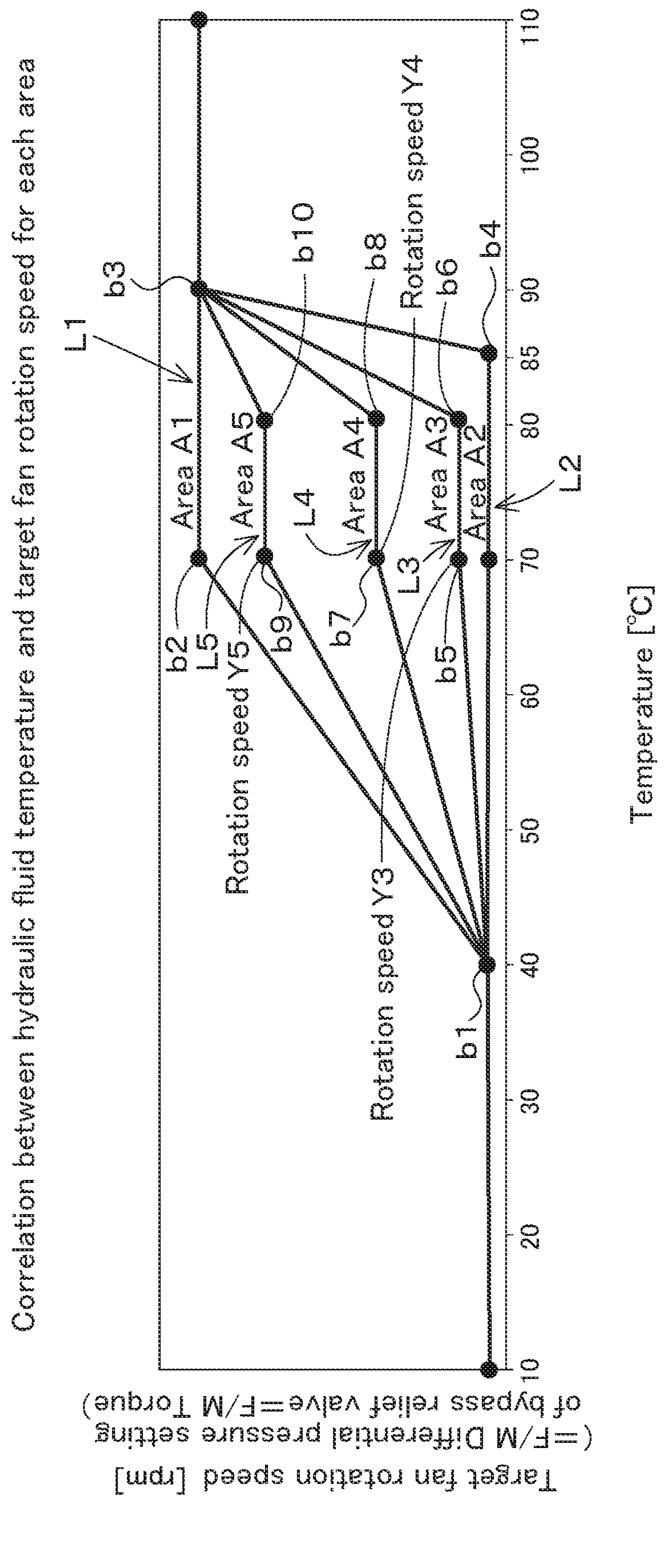
FIG. 5B shows another example of the correlation diagram between the hydraulic fluid temperature and the target fan rotation speed for each area.

FIG. 5B shows another example of the correlation between the fluid temperature (hydraulic fluid temperature) and the target fan rotation speed in each of the areas A1, A2, A3, A4, and A5. The values shown below are just examples and are not limited to thereto.

In the example shown in FIG. 5A, the target fan rotation speed is the minimum rotation speed in each of the areas A1 to A5 when the fluid temperature is 60° C. or lower, while in the example shown in FIG. 5B, the target fan rotation speed is the minimum rotation speed in each of the areas A1 to A5 when the fluid temperature is 40° C. or lower. When the fluid temperature exceeds 40° C., the target fan rotation speed is proportionally increased up to 70° C. in the areas A1, A3, A4, and A5 according to the temperature rising. Otherwise, the system is controlled in the similar manner to the example shown in FIG. 5A.

Figure 5C:
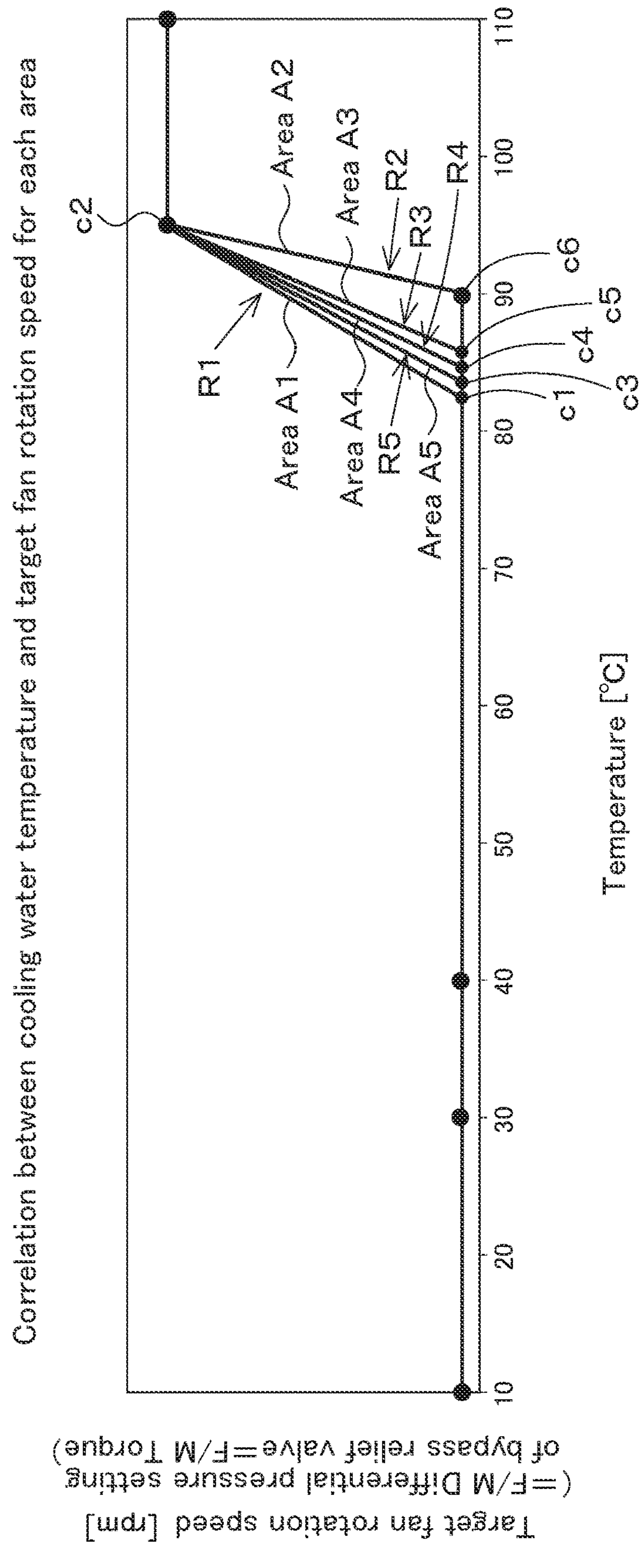
FIG. 5C is a correlation diagram between a cooling water temperature and a target fan rotation speed for each area.

FIG. 5C shows the correlation between the water temperature (cooling water temperature) and the target fan rotation speed for each of the areas A1, A2, A3, A4, and A5.

As shown in FIG. 5C, when the water temperature is below, for example, about 83° C. (point c1), the target fan rotation speed is the minimum rotation speed in the areas A1 to A5. The temperature at point c1 is set to be higher than the temperature at which the thermostat starts to open. Since the cooling water of the engine 6 flows from the engine 6 to the radiator 68 when the thermostat in the engine 6 opens, it is useless to rotate the cooling fan 61 at a water temperature below the temperature at which the thermostat starts to open. Accordingly, a setting not to rotate the cooling fan 61 is adopted, for example.

In addition, on a line R1 that defines the target fan rotation speed in the area A1, the target fan rotation speed is proportionally increased from the minimum rotation speed to the maximum rotation speed according to the temperature rising when the water temperature is between the temperature at the point c1 and the temperature at the point c2 (for example, about 95° C.), and the target fan rotation speed is fixed to the maximum rotation speed when the water temperature is 95° C. or higher.

On a line R5 that defines the target fan rotation speed in the area A5, the target fan rotation speed is proportionally increased according to the temperature rising when the water temperature is between the temperature at the point c3 slightly higher than the temperature at the point c1 (for example, about 84° C.) and the temperature at the point c2, and the target fan rotation speed is fixed to the maximum rotation speed when the water temperature is about 95° C. or higher.

On a line R4 that defines the target fan rotation speed in the area A4, the target fan rotation speed is proportionally increased according to the temperature rising when the water temperature is between the temperature at the point c4 slightly higher than the temperature at the point c3 (for example, about 85° C.) and the temperature at the point c2, and the target fan rotation speed is fixed at the maximum speed when the water temperature is about 95° C. or higher.

On a line R3 that defines the target fan rotation speed in the area A3, the target fan rotation speed is proportionally increased according to the temperature rising when the water temperature is between the temperature at the point c5 slightly higher than the temperature at the point c4 (for example, about 86° C.) and the temperature at the point c2, and the target fan rotation speed is fixed to the maximum rotation speed when the water temperature is about 95° C. or higher.

On a line R2 that defines the target fan rotation speed in the area A2, the target fan rotation speed is proportionally increased according to the temperature rising when the water temperature is between the temperature at the point c6 (for example, about 90° C.) and the temperature at the point c2, and the target fan rotation speed is fixed to the maximum rotation speed when the water temperature is about 95° C. or higher.

The temperature at the point c2 is set to be higher than the temperature at which the thermostat is fully open. That is, the target fan rotation speed is fixed at the maximum speed in a range of temperature exceeding the temperature at which the thermostat is fully opened. The temperature at which the thermostat is fully opened, for example, is between the temperature at the point c5 and the temperature at the point c2. That is, the point c5 and the point c2 are set so that the temperature for full opening the thermostat comes between the temperature at the point c5 and the temperature at the point c2.

Comparing FIG. 5C with FIGS. 5A and 5B, the temperature at the point c1 is set to be higher than the temperature at the point b1. In addition, the temperature at the point c1 is set to be higher than the temperatures at the points b2, b5, b7, and b9. In addition, the temperature at the point c2 is set to be higher than the temperature at the point b3. In addition, the temperature at the point c6 is set to be higher than the temperature at the point b4.

As shown in FIG. 5C, when the water temperature is a preliminarily-determined temperature (predetermined temperature), the first setting unit 51*a* sets a value corresponding to the predetermined temperature on the line R1 to the first target fan rotation speed X1. When the water temperature is a preliminarily-determined temperature (predetermined temperature), the second setting unit 51*b* sets a value corresponding to the predetermined temperature on line R2 to the second target fan rotation speed X2. Since a section between the point c1 to the point c2 on the line R1 is inclined, the reduction rate W1, which is a difference between the first target fan rotation speed X1 and the second target fan rotation speed X2, becomes smaller as the temperature becomes lower.

When the water temperature is a preliminarily-determined temperature (predetermined temperature), the third setting unit 51*c* sets a value corresponding to the predetermined temperature to the third target fan rotation speed X3 on each of the lines R3, R4, and R5.

The third setting unit 51*c* sets, to the increase rate W2, a difference between the second target fan rotation speed X2, which is set in a section defined by the point c5, point c6, and point c2 on the line R2, and the third-a target fan rotation speed X3*a*, which is set in a section defined by the point c5, and point c3 on the line R3.

The third setting unit 51*c* sets, to the increase rate W4, a difference between the third-a target fan rotation speed X3*a*, which is set in a section defined by the point c5 and point b2 on the line R3, and the third-b target fan rotation speed X3*b*, which is set in a section defined by the point c4 and point c2 on the line R4.

The third setting unit 51*c* sets, to the increase rate W4, a difference between the third-c target fan rotation speed X3*b*, which is set in a section defined by the point b4 and point b2 on the line R4, and the third-c target fan rotation speed X3*c*, which is set in a section defined by the point b3 and point c2 on line R5.

The third setting unit 51*c* sets, to the increase rate W5, a difference between the third-c target fan rotation speed X3*c*, which is set in a section defined by the point c3 and point c2 on the line R5, and the first target fan rotation speed X1, which is set in a section defined by the point c1 and point c2 on line R1.

That is, according to the above control, the first setting unit 51*a*, the second setting unit 51*b*, and the third setting unit 51*c* set the first target fan rotation speed X1, the second target fan rotation speed X2, and the third target fan rotation speed X3, respectively, based on the water temperature measured by the measurement device 77.

The controller 51 may control the target fan rotation speed based on one of the water temperature and the fluid temperature measured by the measurement device 77, or may control the target fan rotation speed based on both of the water temperature and the fluid temperature measured by the measurement device 77.

When controlling the target fan rotation speed based on both of the water temperature and the fluid temperature measured by the measurement device 77, the controller 51 selects higher one of the target fan rotation speed set based on the water temperature of the cooling water circulating in the working machine 1 and the target fan rotation speed set based on the fluid temperature of the hydraulic fluid circulating in the working machine 1. That is, the controller 51 compares the target fan rotation speed set based on the water temperature to the target fan rotation speed set based on the fluid temperature, and adopts one of the target fan rotation speeds with the higher numerical value to control a rotation speed of the cooling fan 61.

Figure 6:
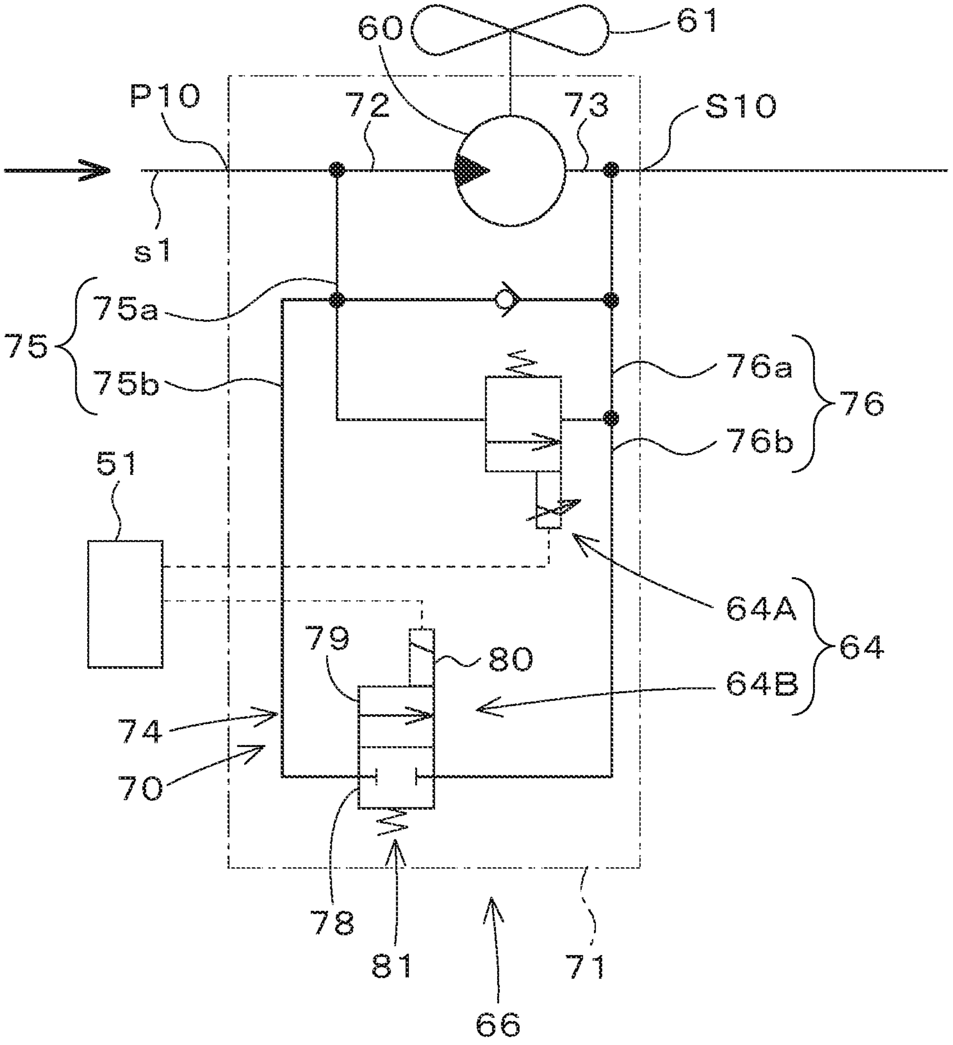
FIG. 6 is a circuit diagram showing a modified example of a cooler.

FIG. 6 shows a modified example of the cooler 66.

In the cooler 66 according to the modified example, the hydraulic pressure adjusting unit (bypass relief valve) 64 includes a solenoid-operated proportional valve (variable relief valve) 64A similar to the above-mentioned configuration, and a solenoid-operated opening/closing valve (unloading valve) 64B. That is, the hydraulic pressure adjusting unit 64 includes the proportional valve 64A and the unloading valve 64B. The unloading valve 64B is a valve configured to be shifted between two positions: a full-closing position 78 and a full-opening position 79. For example, when the solenoid 80 is demagnetized, the unloading valve 64B is held in the full-closing position 78 by a spring 81, and when the solenoid 80 is magnetized, the unloading valve 64B is shifted to the full-opening position 79. The solenoid 80 of the unloading valve 64B is connected to the controller 51.

The upstream fluid line 75 of the bypass fluid line 74 is constituted of a first line 75*a* connecting the first connecting fluid line 72 to the proportional valve 64A, and a second line 75*b* connecting the first line 75*a* to the unloading valve 64B.

The downstream fluid line 76 of the bypass fluid line 74 is constituted of a third line 76*a* connecting the second connecting fluid line 73 to the proportional valve 64A, and a fourth line 76*b* connecting the third line 76*a* to the unloading valve 64B.

Figure 7:
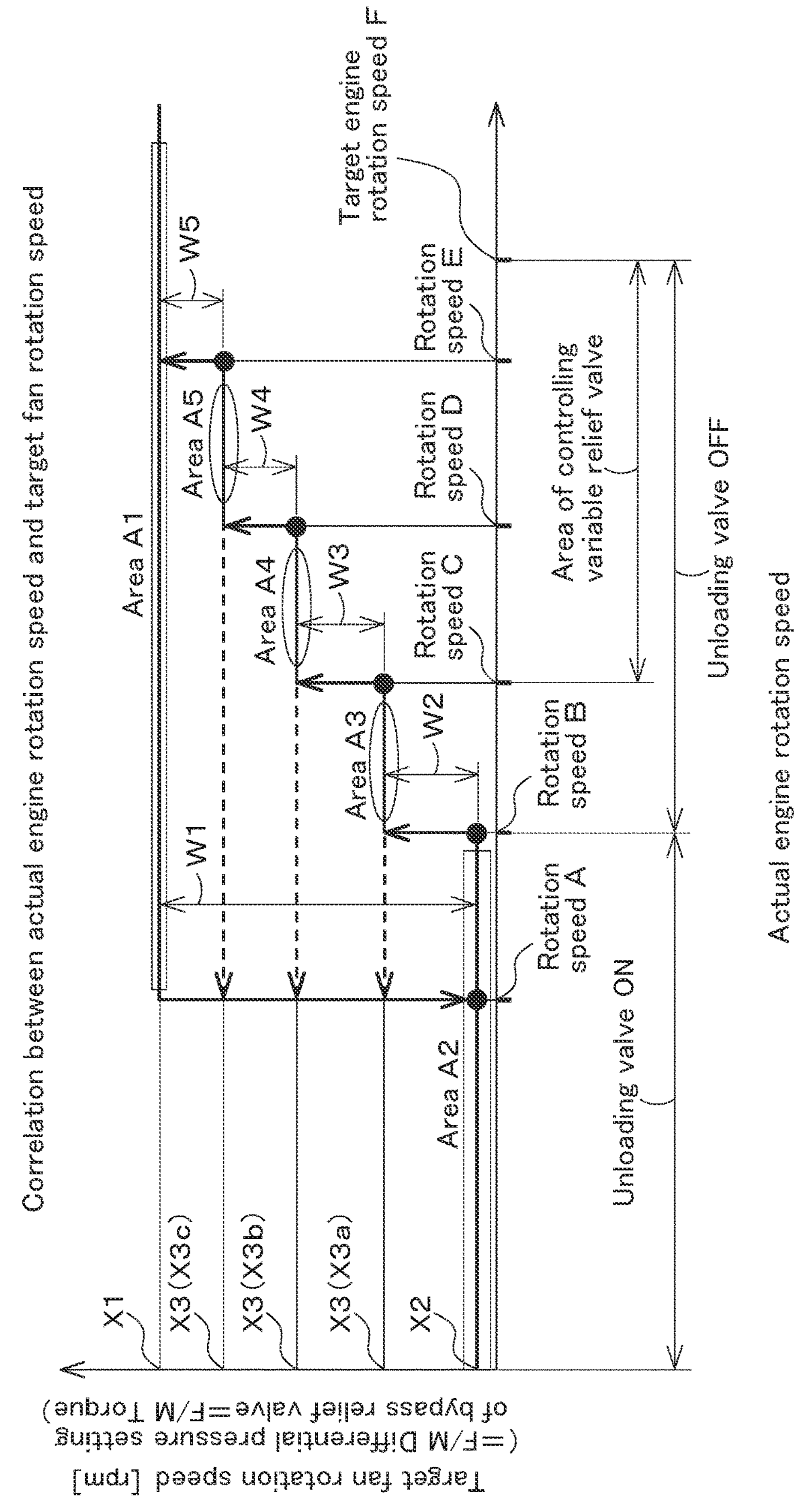
FIG. 7 is a correlation diagram between an actual engine rotation speed and a target fan rotation speed.

In this modified example, as shown in FIG. 7, the unloading valve 64B is activated (shifted to the full-opening position 79) in the area A2, and the target fan rotation speed becomes the second target fan rotation speed X2. At this time, for example, the cooling fan 61 is stopped (may be rotated slightly). In the area A3, the unloading valve 64B is shifted to the full-closing position 78 to be closed. At this time, the proportional valve 64A is opened, and the target fan rotation speed becomes the third-a target fan rotation speed X3*a*. Then, the unloading valve 64B is closed (full-closing position 78), and as the actual engine rotation speed is restored, the target fan rotation speed is increased to the third-a target fan rotation speed X3*a*, the third-b target fan rotation speed X3*b*, the third-c target fan rotation speed X3*c*, and the first target fan rotation speed X1 by controlling an opening degree of the proportional valve 64A.

In the cooler 66 shown in FIG. 6, the bypass circuit 70 including the proportional valve 64A, the unloading valve 64B, and the bypass fluid passage 74 may be located outside the motor housing 71 and housed in a valve housing disposed separately from the motor housing 71.

Other components are configured in the similar manner as those in the above embodiment.

Figure 8:
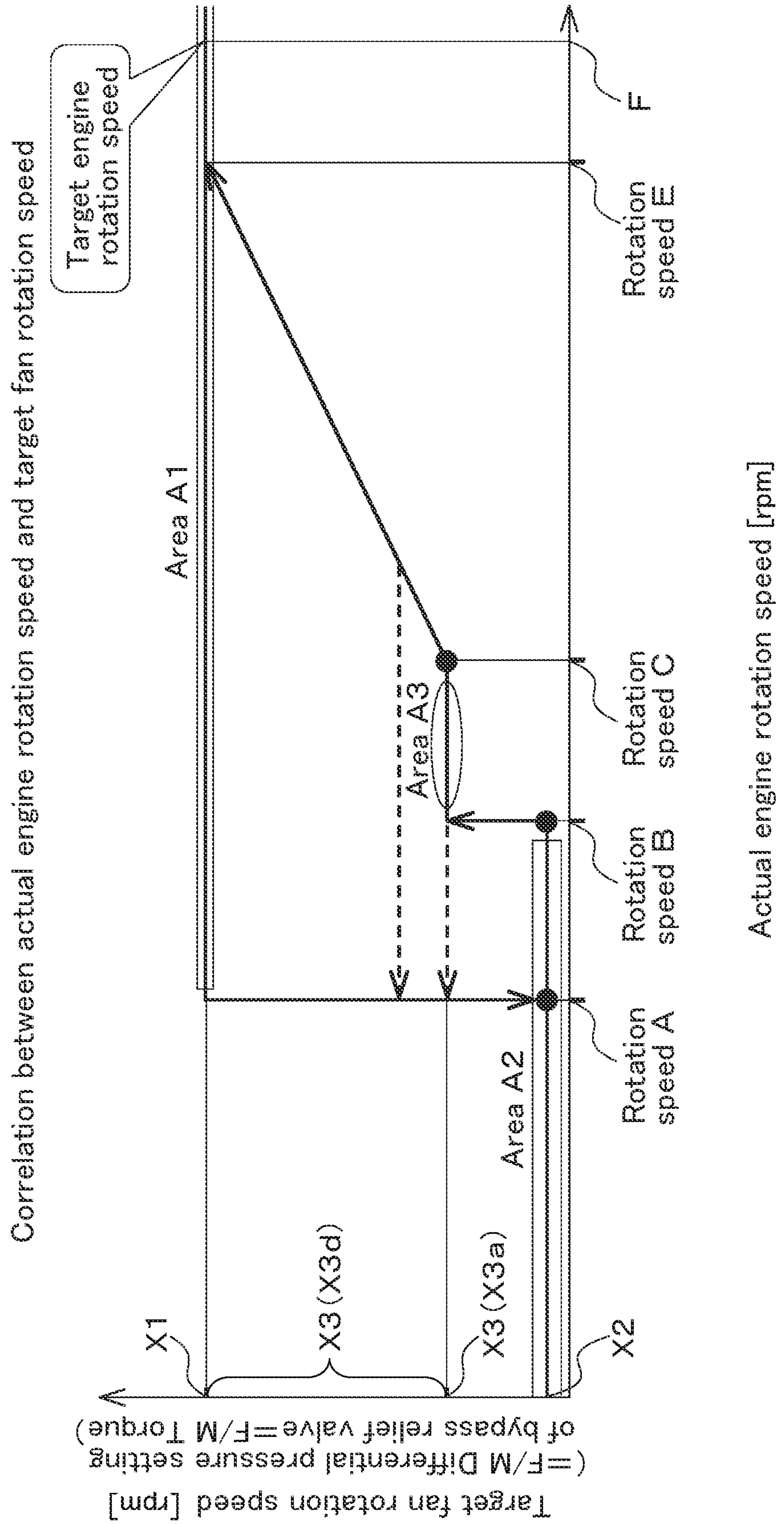
FIG. 8 is a correlation diagram between an actual engine rotation speed and a target fan rotation speed according to another embodiment.
Figure 9:
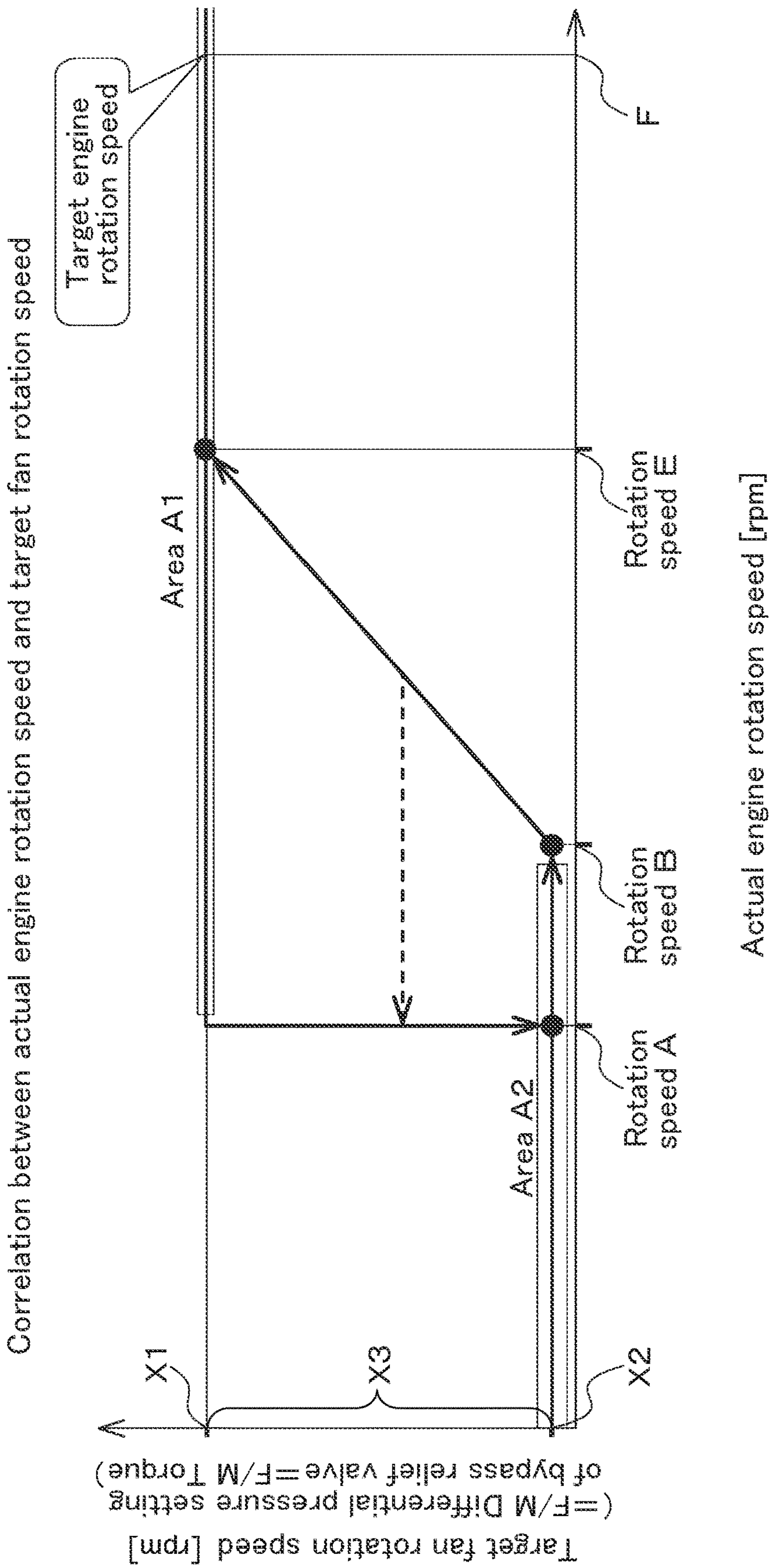
FIG. 9 is a correlation diagram between the actual engine rotation speed and the target fan rotation speed according to the other embodiment.

FIGS. 8 and 9 show the reduction and restoration controls of the target fan rotation speed according to another embodiment. In the other embodiment, the restoration control is modified to restore the target fan rotation speed after the actual engine rotation speed is reduced by a threshold rotation speed (rotation speed A) or more and then the target fan rotation speed is reduced to the second target fan rotation speed X2.

In the embodiment shown in FIG. 8, when the actual engine rotation speed is restored to the rotation speed B, the target fan rotation speed is increased to the third-a target fan rotation speed X3*a*, the third-a target fan rotation speed X3*a* is maintained until the actual engine rotation speed is restored to the rotation speed C, and in restoring the actual engine rotation speed from the rotation speed C to the rotation speed E, the target rotation speed is continuously increased from the third-a target fan rotation speed X3*a* to the first target fan rotation speed X1 according to the increase (restoration) of the actual engine rotation speed. That is, in the third setting unit 51*c* of FIG. 8 according to the present embodiment, a third-d target fan rotation speed X3*d*, which is the third target fan rotation speed X3 of the case where the actual engine rotation speed is restored from the rotation speed C to the following rotation speeds, is set steplessly between the third-a target fan rotation speed X3*a* and the first target fan rotation speed X1.

In addition, in the embodiment of FIG. 8, when the actual engine rotation speed is reduced in performing the restoration control, the current target fan rotation speed is maintained until the actual engine rotation speed reaches the threshold rotation speed (rotation speed A), and when the actual engine rotation speed is reduced by the threshold rotation speed (rotation speed A) or more, the target fan rotation speed is reduced to the second target fan rotation speed X2.

An embodiment shown in FIG. 9 maintains the target fan rotation speed at the second target fan rotation speed X2 until the actual engine rotation speed is restored to the rotation speed B. In restoring the actual engine rotation speed from the rotation speed B to the rotation speed E, the target fan rotation speed is continuously increased from the second target fan rotation speed X2 to the first target fan rotation speed X1 according to the increase of the actual engine rotation speed. That is, in the third setting unit 51*c* of FIG. 9 according to the embodiment, the third target fan rotation speed X3 is set steplessly between the second target fan rotation speed X2 and the first target fan rotation speed X1.

In addition, in the embodiment of FIG. 9, the similar control to the above-mentioned control of FIG. 8 is performed when the actual engine rotation speed is reduced in performing the restoration control.

In the above-described embodiment, the cooler 66 is exemplified by a hydraulically-driven device, but the cooler 66 is not limited thereto, and the cooler 66 may be a device configured to be driven using a power of the engine (prime mover) 6 and directly driven by the power of the engine 6. That is, the cooler 66 may be a device configured to be driven by the power of the engine (prime mover) 6.

Figure 10:
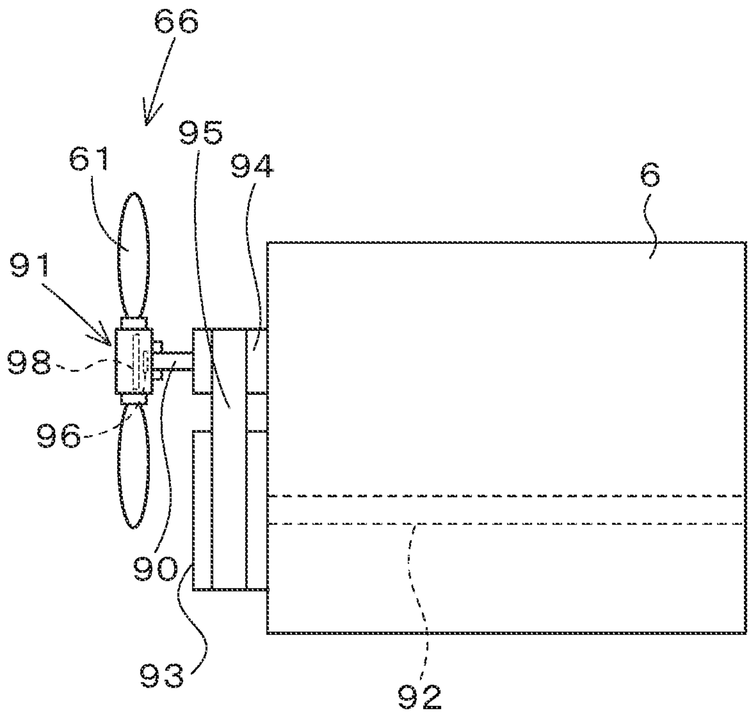
FIG. 10 is a side view of a cooler, an engine and the like according to the other embodiment.
Figure 11:
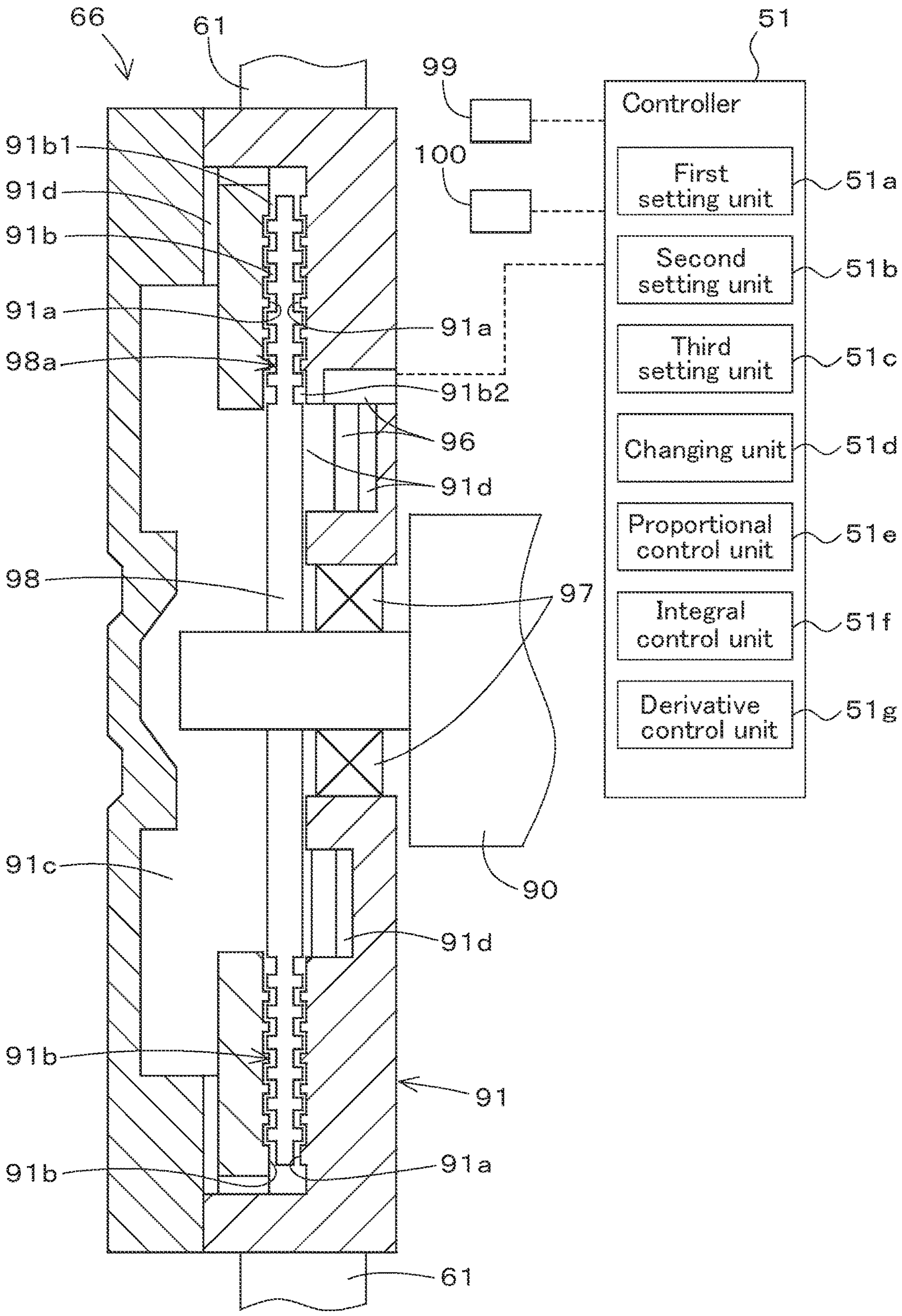
FIG. 11 is a detailed view of the cooler according to the other embodiment.

FIGS. 10 and 11 show the cooler 66 according to further another embodiment that is the cooler 66 configured to be directly driven by the power of the engine (prime mover) 6.

As shown in FIG. 10, the cooler 66 is a device to be driven by the engine 6 serving as a power source, and is a viscous clutch fan using a viscous fluid. The cooler 66 includes a rotating shaft 90, a rotor 98, a housing (case) 91, a fluid setting unit (fluid setting device) 96, and the cooling fan 61.

The rotor 98, the housing 91, the fluid setting unit 96, and the fluid (silicon fluid) sealed in the housing 91 constitute a fluid clutch configured to transmit a power of the rotating shaft 90 to the cooling fan 61 via the fluid in the housing 91.

The rotating shaft 90 is a shaft that is rotated by the rotational power of an output shaft 92 of the engine 6. For example, a pulley 93 that rotates with the output shaft 92 is disposed on the output shaft 92 of the engine 6. In addition, a pulley 94 that rotates with the rotating shaft 90 is disposed on the rotating shaft 90. A belt (drive belt) 95 is looped over the pulley 93 and the pulley 94, so that a rotational power of the pulley 93 is transmitted to the pulley 94 via the drive belt 95. That is, the rotary shaft 90 is rotated by the rotational power of the output shaft 92 of the engine 6.

As shown in FIG. 11, the rotor 98 is fixed to the rotary shaft 90 and rotates with the rotary shaft 90. The rotor 98 is disk-shaped and has an annular labyrinth portion (groove portion) 98*a* formed on an outer surface thereof. The rotor 98 is housed in the housing 91.

The housing 91 is rotatably supported on the rotating shaft 90 via a bearing 97. The cooling fan 61 having a plurality of blades is attached to the outside of the housing 91. Accordingly, the cooling fan 61 can be rotated by rotating the housing 91.

The housing 91 has a wall portion 91*a* disposed close to the labyrinth portion 98*a* of the rotor 98. A gap (operation gap) 91*b* is formed between the wall 91*a* of the housing 91 and the labyrinth portion 98*a* of the rotor 98. By introducing a viscous fluid (e.g., silicon fluid) into the gap 91*b*, the rotational power of the rotor 98 is transmitted to the housing 91. The housing 91 is rotated by the rotational power of the rotor 98.

The housing 91 includes a storage chamber 91*c* and a flow passage 91*d*. The storage chamber 91*c* is a chamber for temporarily storing silicon fluid and is disposed on a tip end portion of the rotating shaft 90. The flow passage 91*d* is a circulation-type flow passage that connects the storage chamber 91*c* to the gap 91*b*. That is, the flow passage 91*d* connects the storage chamber 91*c* to an outlet portion 91*b*1 of the gap 91*b*, and connects the storage chamber 91*c* to an inlet portion 91*b*2 of the gap 91*b*. Accordingly, the silicon fluid introduced into the gap 91*b* flows through the flow passage 91*d* into the storage chamber 91*c*, and then flows from the storage chamber 91*c* into the flow passage 91*d* so that the silicon fluid can return to the gap 91*b*.

The fluid setting unit (fluid setting device) 96 is a device that sets an amount of silicon fluid to be introduced into the gap 91*b*. The fluid setting unit 96 is a solenoid valve configured to close an intermediate portion of the flow passage 91*d*. That is, the fluid setting unit 96 includes a coil (solenoid), a pin capable of being moved by the magnetization of the coil, and a valve body disposed at a tip of the pin. The pin and the valve body of the fluid setting unit 96 are disposed in the flow passage 91*d*, and the inside of the flow passage 91*d* can be opened or closed by movement of the pin. When the fluid setting unit 96 is activated to change an opening degree thereof, the amount of fluid introduced from the storage chamber 91*c* into the gap 91*b* through the fluid setting unit 96 can be regulated.

The silicon fluid that entered the gap 91*b* enters the storage chamber 91*c* through the flow passage 91*d*. Here, under a state where the flow passage 91*d* is fully closed by the fluid setting unit 96, the silicon fluid cannot flow into the gap 91*b* from the storage chamber 23. When the valve body of the fluid setting unit 96 is opened, the silicon fluid in the storage chamber 91*c* can flow into the gap 91*b* through the fluid setting unit 96. The amount of silicon fluid introduced to the gap 91*b* (slipping rate of the fluid clutch) can be used to change a rotation speed of the cooling fan 61 (housing 91).

For example, by increasing the amount of silicon fluid introduced to the gap 91*b*, the actual rotation speed of the cooling fan 61 (actual fan rotation speed) can be increased until the actual rotation speed substantially matches the actual engine rotation speed. In addition, by reducing the amount of silicon fluid introduced to the gap 91*b*, a torque transmitted from the rotating shaft 90 to the housing 91 via the rotor 98 becomes smaller. That is, by reducing the amount of silicon fluid introduced to the gap 91*b*, a ratio of the actual fan rotation speed to the actual engine rotation speed is reduced.

The control of the cooler 66 (control of rotation of the cooling fan 61) is performed by the controller 51 that is constituted of a CPU or the like. The controller 51 controls a rotation speed of the cooling fan 61 by outputting a control signal to the fluid setting unit 96 to change an opening degree of the fluid setting unit 96.

Figure 12:
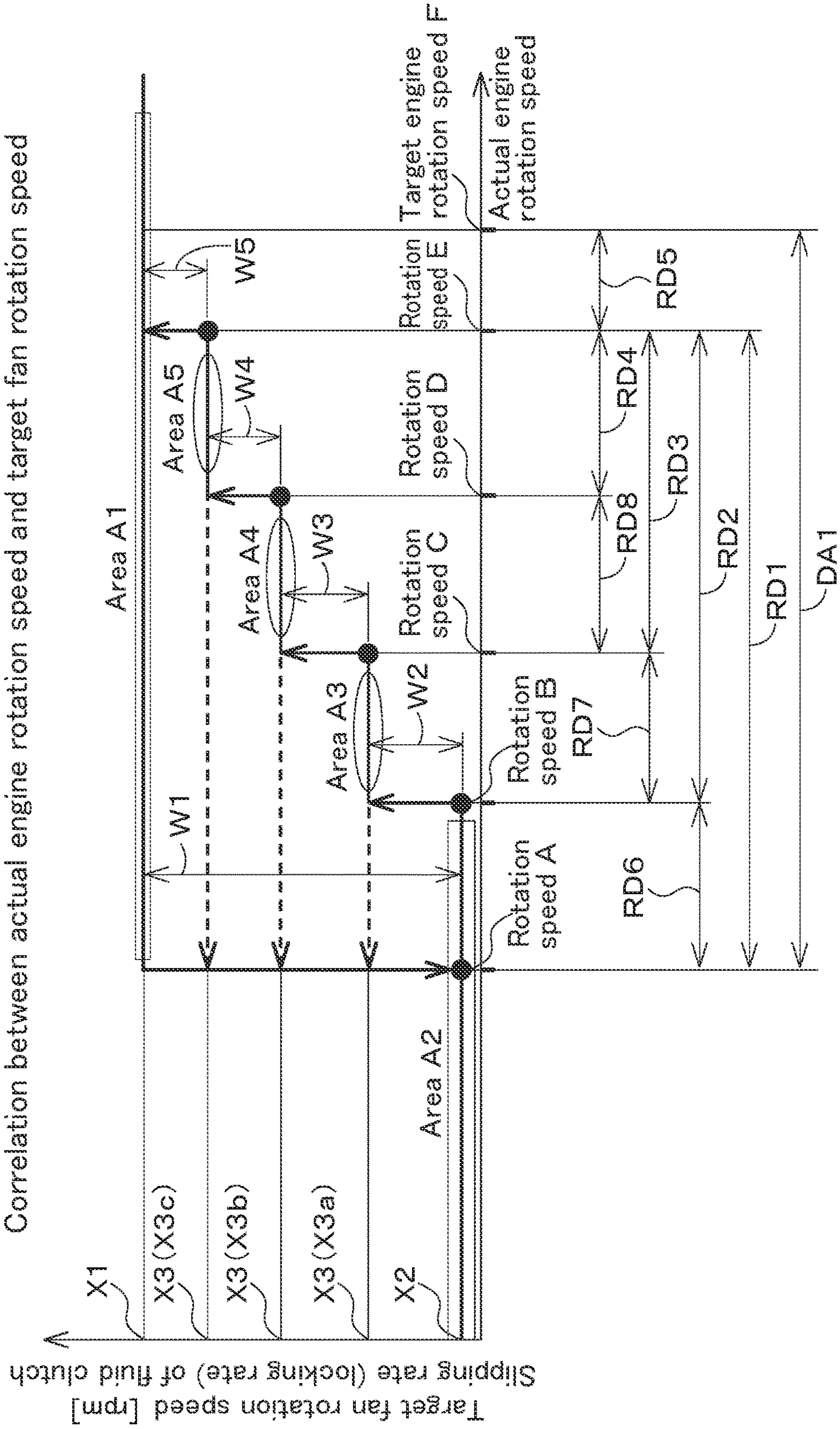
FIG. 12 is a correlation diagram between the actual engine rotation speed and the target fan rotation speed according to the other embodiment.

In detail, as shown in FIG. 11, the controller 51 in this alternative embodiment includes the first setting unit 51*a* configured to set the target fan rotation speed unless the actual engine rotation speed is reduced and becomes less than a threshold rotation speed, the second setting unit 51*b* configured to set the target fan rotation speed in performing the reduction control, and the third setting unit 51*c* configured to set the target fan rotation speed in performing the restoration control. As shown in FIG. 12, in the reduction control, the target fan rotation speed is reduced from a rotation speed corresponding to the area A1 to a rotation speed corresponding to the area A2. And, in the restoration control, the target fan rotation speed is increased (restored) from the rotation speed corresponding to area A2 to the rotation speeds corresponding to the areas A3, A4, and A5 in this order.

Details of the reduction control and the restoration control to the target fan rotation speed are similar to those of the above-mentioned embodiment, so the explanations thereof are omitted.

FIG. 12 is a view showing a correlation between the actual engine rotation speed and the target fan rotation speed, where the horizontal axis shows the actual engine rotation speed and the vertical axis shows the target fan rotation speed (a slipping rate (or a locking rate) of the fluid clutch).

The slipping rate of the fluid clutch represents a loss of rotation speed between an input side (rotating shaft 90) and an output side (cooling fan 61), and in a case where a rotation speed of the rotating shaft 90 is directly transmitted to the cooling fan 61, the slipping rate is 0% (locking rate is 100%). In addition, in a case where the rotation speed of the rotary shaft 90 is not transmitted to the cooling fan 61 in order to reduce a rotation speed of the cooling fan 61, the slipping rate will be 100% (locking rate is 0%). However, it is not necessary that the first target fan rotation speed X1 is always given at 0% slipping rate (100% locking rate). In addition, it is not necessary that the second target fan rotation speed X2 is always given at 100% slipping rate (0% locking rate).

The “target fan rotation speed” on the vertical axis of FIG. 12 is the slipping rate of the fluid clutch, and also in the other embodiment, the term “target fan rotation speed” is used for convenience of explanation.

In addition, as shown in FIG. 11, the controller 51 includes the changing unit 51*d* configured to change the fifth rotation speed difference RD5 in accordance with the change in the instructed engine rotation speed.

Since the control by the changing unit 51*d* is similar to that according to the above-mentioned embodiment, the drawings and descriptions are omitted.

As shown in FIG. 11, a first detector (prime mover rotation detector) 99 and a second detector 100 are connected to the controller 51. The controller 51 is capable of obtaining detection information of the first detector 99 and the second detector 100. The first detector 99 is a device configured to detect the actual engine rotation speed. That is, the first detector 99 is disposed in the vicinity of the output shaft 92 and detects the actual rotation speed of the output shaft 92 of the engine 6 (actual engine rotation speed). The second detector 100 is a device configured to detect the actual rotation speed of the cooling fan 61 (housing 91). That is, the second detector 100 is disposed in the vicinity of the cooling fan 61 or the housing 91 and detects the actual rotation speed of the cooling fan 61.

In addition, the controller 51 includes a proportional control unit 51*e*, an integral control unit 51*f*, and a derivative control unit 51*g*. The proportional control unit 51*e*, the integral control unit 51*f*, and the derivative control unit 51*g* are constituted of electrical/electronic components constituting the controller 51, computer programs installed in the controller 51, or the like.

The controller 51 obtains a difference between the actual fan rotation speed detected by the second detector 100 and the target fan rotation speed. The proportional control unit 51*e* performs a proportional control by multiplying the difference between the actual fan rotation speed and the target fan rotation speed by a preliminarily-determined proportional gain.

The integral control unit 51*f* performs an integral control (I-control) by multiplying the difference between the actual fan rotation speed and the target fan rotation speed by an integral gain (0 or a positive constant) set through execution of an integral start-timing changing process.

The derivative control unit 51*g* performs a derivative control (D-control) by multiplying the difference between the actual fan rotation speed and the target fan rotation speed by a preliminarily-determined derivative gain.

In this manner, the controller 51 sets a rotation speed of the cooling fan 61 by determining a control value (operation amount) under a PID control and outputting a control signal corresponding to the control value to the coil of the fluid setting unit 96. The control signal is a signal whose duty ratio is set according to the control value, and the controller 51 sets an opening degree of the fluid setting unit 96 under a PWM control.

In the alternative embodiment shown in FIGS. 10 and 11, the control of the target fan rotation speed based on the temperatures (fluid temperature and water temperature) is performed, as shown in FIGS. 5A, 5B, and 5C. In this case, each of the vertical axes in FIG. 5A, FIG. 5B, and FIG. 5C is the target fan rotation speed (=slipping rate (locking rate) of the fluid clutch), in the other embodiment.

In addition, in the alternative embodiment shown in FIGS. 10 and 11, the reduction and restoration controls of the target fan rotation speed may be performed in a manner of the embodiment shown in FIGS. 8 and 9. In this case, each of the vertical axes in FIGS. 8 and 9 is the target fan rotation speed (=slipping rate (locking rate) of the fluid clutch), in the other embodiment.

In the described embodiment, the working machine 1 includes the prime mover (engine 6), the hydraulic pump P2 driven by power of the prime mover 6, the cooler 66 including the cooling fan 61 rotated by either the power of the prime mover 6 or hydraulic fluid delivered from the hydraulic pump P2, and the controller 51 configured or programmed to perform the reduction control for reducing the target fan rotation speed that is the target rotation speed of the cooling fan 61 in response to reduction of the actual prime mover rotation speed that is the actual rotation speed of the prime mover 6, and to perform, after the reduction control, the restoration control for restoring the target fan rotation speed. The controller 51 is configured or programmed to make a difference between the reduction rate W1 of the target fan rotation speed in the reduction control and the increase rates W2, W3, W4, and W5 of the target fan rotation speed in the restoration control.

According to this configuration, in performing work in which the prime mover 6 is subjected to an overload exceeding a predetermined level, the target fan rotation speed can be suppressed to increase horsepower to be used for the work, thereby improving workability.

Also, the controller 51 is configured or programmed to make the increase rates W2, W3, W4, and W5 of the target fan rotation speed in the restoration control less than the reduction rate W1 of the target fan rotation speed in the reduction control.

According to this configuration, the restoration of the prime mover 6 can be hastened by restoring the target fan rotation speed slowly.

Also, the controller 51 is configured or programmed to perform the reduction control when the actual prime mover is reduced to a value less than the threshold rotation speed (rotation speed A). The controller 51 includes the first setting unit 51*a* configured or programmed to set the target fan rotation speed unless the actual prime mover rotation speed is reduced to a value less than the threshold rotation speed, the second setting unit 51*b* configured or programmed to set the target fan rotation speed when the reduction control is performed, and the third setting unit 51*c* configured or programmed to set the target fan rotation speed when the restoration control is performed.

According to this configuration, in performing work in which the prime mover 6 is subjected to an overload exceeding a predetermined level, the target fan rotation speed can be suppressed to increase horsepower to be used for the work.

Also, the second setting unit 51*b* is configured or programmed so that the second target fan rotation speed X2 that is the target fan rotation speed for the reduction control is less than the first target fan rotation speed X1 that is the target fan rotation speed set by the first setting unit 51*a*, and the third setting unit 51*c* is configured or programmed so that a third target fan rotation speed X3 that is the target fan rotation speed for the restoration control is not less than the second target fan rotation speed X2 and is less than the first target fan rotation speed X1.

According to this configuration, the target fan rotation speed can be restored slowly, thereby quickly restoring the prime mover 6.

Also, the working machine 1 includes the measurement device 77 configured to measure at least either one of a water temperature that is a temperature of cooling water circulated in the working machine 1 and a fluid temperature that is a temperature of hydraulic fluid circulated in the working machine 1. Each of the first, second and third setting units 51*a*, 51*b*, and 51*c* is configured or programmed to set the corresponding first, second or third target fan rotation speed X1, X2, or X3 based on the at least either one of the water temperature and the fluid temperature measured by the measurement device 77.

According to this configuration, temperature rising of the cooled objects to be cooled by the cooler 66 can be mitigated.

Also, the third setting unit 51*c* is configured or programmed to increase an increase rate of the third target fan rotation speed X3 according to increase of the least one of the water temperature and the fluid temperature measured by the measurement device 77.

According to this configuration, overheating of the cooled objects to be cooled by the cooler 66 can be suppressed.

Also, the third setting unit 51*c* is configured or programmed to set a plurality of target rotation speeds each of which serves as the third target fan rotation speed X3 that is not less than the second target fan rotation speed X2 and is less than the first target fan rotation speed X1.

According to this configuration, the target fan rotation speed under the restoration control can be restored slowly.

Also, the controller 51 is configured or programmed to select either greater one of the target fan rotation speed set based on a water temperature that is a temperature of cooling water circulated in the working machine 1 and the target fan rotation speed set based on a fluid temperature that is a temperature of hydraulic fluid circulated in the working machine 1.

According to this configuration, overheating can be suppressed.

Also, the controller 51 is configured or programmed to keep the reduction control from being performed when the water temperature that is a temperature of cooling water circulated in the working machine 1 or the fluid temperature that is a temperature of hydraulic fluid circulated in the working machine 1 is not less than a predetermined value.

According to this configuration, overheating can be suppressed.

Also, the cooler 66 includes the hydraulic motor 60 to rotate the cooling fan 61 with the hydraulic fluid, the bypass fluid passage 74 connected to inlet and outlet ports of the hydraulic motor 60, and the hydraulic pressure adjusting unit 64 configured or programmed to adjust a flow rate of the hydraulic fluid through the bypassing fluid passage 74, and the cooler 66 is configured or programmed to change the target fan rotation speed by adjusting the flow rate of the hydraulic fluid by means of the hydraulic pressure adjusting unit 64.

According to this configuration, in the working machine 1 employing the cooler 66 configured to change the target fan rotation speed by regulating a flow rate of the hydraulic fluid, the target fan rotation speed can be suppressed to increase horsepower to be used for the work when the prime mover 6 is subjected to an overload exceeding a predetermined level.

In the described embodiment, the working machine 1 includes the prime mover (engine 6), the hydraulic pump P2 driven by power of the prime mover 6, the cooler 66 including the cooling fan 61 rotated by either the power of the prime mover 6 or hydraulic fluid delivered from the hydraulic pump P2, the controller 51 configured or programmed to perform the reduction control for reducing the target fan rotation speed that is the target rotation speed of the cooling fan 61 when the actual prime mover rotation speed that is the actual rotation speed of the prime mover 6 is reduced to a value less than the threshold rotation speed (rotation speed A), and to perform, after the reduction control, a restoration control for restoring the target fan rotation speed, and the prime mover rotation setting member 25*b* configured to output an operation signal to instruct a target prime mover rotation speed (target engine rotation speed F) that is the target rotation speed of the prime mover 6. The controller 51 is configured or programmed to control the target prime mover rotation speed based on the instructed prime mover rotation speed that is the instructed rotation speed instructed by the prime mover rotation setting member 25*b*, and to change the threshold rotation speed in correspondence to variation of the instructed prime mover rotation speed.

According to this configuration, when performing work in which the prime mover 6 is subjected to an overload exceeding a predetermined level, the target fan rotation speed can be suppressed to increase horsepower to be used for the work, thereby improving workability.

In addition, by changing a threshold rotation speed in accordance with changing of the instructed prime mover rotation speed, it is possible to achieve both a good performance at high instructed prime mover rotation speed and a good performance at low instructed prime mover rotation speed.

Also, the controller 51 is configured or programmed to reduce the threshold rotation speed according to reduction of the instructed prime mover rotation speed.

According to this configuration, a threshold rotation speed can be changed to an optimum value in accordance with changing of the instructed prime mover rotation speed.

Also, the controller 51 is configured or programmed to set a plurality of rotation speeds of the prime mover between the threshold rotation speed and the target prime mover rotation speed defined as actual restoration-controlled prime mover rotation speeds (rotation speeds B to E), to perform the restoration control to increase the target fan rotation speed in a stepwise manner starting from the smallest one (rotation speed B) of the plurality of actual restoration-controlled engine rotation speeds, and to define a difference between the maximum rotation speed (rotation speed E) of the set actual restoration-controlled prime mover rotation speeds and the threshold rotation speed as a fixed value, and change the difference between the maximum rotation speed and the target prime mover rotation speed in correspondence to variation of the instructed prime mover rotation speed.

According to this configuration, a threshold rotation speed can be changed to an optimum value in accordance with changing of the instructed prime mover rotation speed.

Also, the controller is configured or programmed to change the difference between the maximum rotation speed and the target prime mover rotation speed in proportion to variation of the instructed prime mover rotation speed.

According to this configuration, a threshold rotation speed can be changed to an optimum value in accordance with changing of the instructed prime mover rotation speed.

Also, the plurality of actual restoration-controlled prime mover rotation speeds include at least one intermediate rotation speed (rotation speeds C and D) between the minimum rotation speed and the maximum rotation speed, and a difference between the threshold rotation speed and the minimum rotation speed is larger than a difference between the minimum rotation speed and the intermediate rotation speed adjoining to the minimum rotation speed.

According to this configuration, by increasing a difference between a threshold rotation speed and the minimum rotation speed, hunting of the control due to the actual engine rotation speed varied back and forth between the threshold rotation speed and the minimum rotation speed can be suppressed.

Also, when the actual prime mover rotation speed is reduced during the restoration control, the controller 51 is configured or programmed to keep the presently set target fan rotation speed until the reduced actual prime mover rotation speed reaches the threshold rotation speed, and to reduce the target fan rotation speed when the reduced actual prime mover rotation speed is less than the threshold rotation speed.

According to this configuration, the hunting of the control can be suppressed.

Also, the reduction control is defined as control to reduce the target fan rotation speed to the minimum thereof including a rotation speed of zero.

According to this configuration, horsepower consumed at the target fan rotation speed can be sufficiently suppressed when the prime mover 6 is subjected to an overload.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A working machine comprising:

a prime mover;

a hydraulic pump driven by power of the prime mover;

a cooler including a cooling fan rotated by hydraulic fluid delivered from the hydraulic pump;

a controller configured or programmed to perform a reduction control for reducing a target fan rotation speed that is a target rotation speed of the cooling fan when an actual prime mover rotation speed that is an actual rotation speed of the prime mover is reduced to a value less than a threshold rotation speed, and to perform, after the reduction control, a restoration control for restoring the target fan rotation speed set before the reduction control; and a prime mover rotation setting member configured to output, to the controller, an operation signal to instruct a target prime mover rotation speed that is a target rotation speed of the prime mover, wherein the controller is configured or programmed to control the target prime mover rotation speed based on an instructed prime mover rotation speed that is an instructed rotation speed instructed by the prime mover rotation setting member, and to change the threshold rotation speed in correspondence to variation of the instructed prime mover rotation speed.

2. The working machine according to claim 1, wherein the controller is configured or programmed to reduce the threshold rotation speed according to reduction of the instructed prime mover rotation speed.

3. The working machine according to claim 1, wherein the controller is configured or programmed to set a plurality of rotation speeds of the prime mover between the threshold rotation speed and the target prime mover rotation speed defined as actual restoration-controlled prime mover rotation speeds, to perform the restoration control to increase the target fan rotation speed in a stepwise manner starting from a minimum rotation speed which is the smallest one of the actual restoration-controlled prime mover rotation speeds, and to define a difference between a maximum rotation speed which is the maximum one of the set actual restoration-controlled prime mover rotation speeds and the threshold rotation speed as a fixed value, and change a difference between the maximum rotation speed and the target prime mover rotation speed in correspondence to variation of the instructed prime mover rotation speed.

4. The working machine according to claim 3, wherein the controller is configured or programmed to change the difference between the maximum rotation speed and the target prime mover rotation speed in proportion to variation of the instructed prime mover rotation speed.

5. The working machine according to claim 3, wherein the actual restoration-controlled prime mover rotation speeds include at least one intermediate rotation speed between the minimum rotation speed and the maximum rotation speed, and a difference between the threshold rotation speed and the minimum rotation speed is larger than a difference between the minimum rotation speed and the intermediate rotation speed adjoining to the minimum rotation speed.

6. The working machine according to claim 1, wherein when the actual prime mover rotation speed is reduced during the restoration control, the controller is configured or programmed to keep the presently set target fan rotation speed until the reduced actual prime mover rotation speed reaches the threshold rotation speed, and to reduce the target fan rotation speed when the reduced actual prime mover rotation speed is less than the threshold rotation speed.

7. The working machine according to claim 1, wherein the reduction control is defined as control to reduce the target fan rotation speed to the minimum thereof including a rotation speed of zero.

* * * * *